(12) United States Patent
Thompson et al.

(10) Patent No.: US 6,282,005 B1
(45) Date of Patent: *Aug. 28, 2001

(54) OPTICAL SURFACE PLASMON-WAVE COMMUNICATIONS SYSTEMS

(76) Inventors: Leo J. Thompson, 131 Newport La., Lilburn, GA (US) 30047; Emmanuel Anemogiannis, 1855 Berkeley Mews, Atlanta, GA (US) 30329

( * ) Notice: Subject to any disclaimer, the term of this patent is extended or adjusted under 35 U.S.C. 154(b) by 0 days.

This patent is subject to a terminal disclaimer.

(21) Appl. No.: 09/081,855

(22) Filed: May 19, 1998

(51) Int. Cl.[7] ................................................. H04B 10/12
(52) U.S. Cl. ..................... 359/173; 359/124; 359/133; 359/181; 359/254
(58) Field of Search ................................. 359/124, 133, 359/173, 181, 254

(56) References Cited

U.S. PATENT DOCUMENTS

| | | | |
|---|---|---|---|
| 4,432,614 | * | 2/1984 | McNeill et al. ...................... 350/386 |
| 4,765,705 | * | 8/1988 | Seymour et al. ................... 350/96.15 |
| 4,948,225 | * | 8/1990 | Rider et al. ........................ 350/96.34 |

(List continued on next page.)

FOREIGN PATENT DOCUMENTS

| | | |
|---|---|---|
| 0606170A2 | 3/1993 | (EP) . |
| 0758169A2 | 8/1995 | (EP) . |

OTHER PUBLICATIONS

Surface Wave (Plasmon) SLM's and Their Potential Uniformity Advantages XP–002114395 Caldwell M.E. et al. IEE Colloquium on Two–Dimensional Opti–network Device Arrays, 1991, pp. 5/1–5/6.

Michael N. Zervas; "Surface Plasmon–Polariton Waves Guided by Thin Metal Films"; Optics Letters; vol. 16, No. 10; May 15, 1991.

(List continued on next page.)

*Primary Examiner*—Leslie Pascal
*Assistant Examiner*—Hanh Phan
(74) *Attorney, Agent, or Firm*—Morris, Manning & Martin, LLP

(57) ABSTRACT

A plurality of optical communications systems including a SPW modulator are described. The communications systems include an optical transmitter coupled to an optical fiber communications link which carries a optically modulated information signal to an optical receiver. The laser transmitter includes a laser light source which is optically coupled to a SPW modulator which has been particularly adapted for broadband communications by selecting its transfer characteristic and modulation structure. A broadband signal containing a plurality of information channels, for example CATV channels, is applied to it modulator electrodes. The modulation signal varies the power coupling between the guided laser light source signal and a SPW in the modulator. The result is an intensity modulated optical signal that is output to the optical fiber for transmission to the optical receiver of the system. Alternatively, the communications system includes a high power laser coupled to an optical splitter to divide its output power in two or more optical source outputs. Each optical source output is then used to drive an associated SPW modulator. Each of the modulators receives a broadband signal with which to modulate its optical source. After modulation, the modulated lightwave from a modulator is coupled to a corresponding optical fiber for carriage to an optical receiver. In this manner, several broadband information signals can be communicated over the system using only one laser source. A net benefit from using one higher power laser, rather than several lower power ones, is one of cost, purity and similarity of the several signals. This configuration is enhanced by the lower loss and higher linearity of the SPW modulators. Further, several WDM embodiments including those having serially cascaded SPW modulators are provided. The transfer characteristic of the SPW modulators are tailored to either be more efficient for an analog or a digital modulation signal by adding or subtracting grating effects.

67 Claims, 13 Drawing Sheets

U.S. PATENT DOCUMENTS

| | | | |
|---|---|---|---|
| 4,971,426 | * 11/1990 | Schildkraut et al. | 350/385 |
| 5,067,788 | * 11/1991 | Jannson et al. | 385/2 |
| 5,625,729 | * 4/1997 | Brown | 385/31 |
| 5,663,822 | 9/1997 | Fee . | |
| 5,701,186 | * 12/1997 | Huber | 359/125 |
| 5,729,641 | * 3/1998 | Chandonnet et al. | 385/2 |
| 5,870,213 | * 2/1999 | Ishikawa et al. | 359/135 |
| 6,034,809 | * 3/2000 | Anemogiannis | 359/254 |

OTHER PUBLICATIONS

Creaney et al.; "Continuous–Fiber Modulator with High–Bandwidth Coplanar Strip Electrodes"; IEEE Photonics Technology Letters; vol. 8, No. 3; Mar. 1996; pp. 355–357.

Wilkinson et al.; "Optical Fibre Modulator Using Electro–Optic Polymer Overlay"; Electronics Letters; May 23, 1991; vol. 27, No. 11; pp. 979–981.

Tseng et al.; "Side–polished Fibers"; Applied Optics; vol. 31, No. 18; Jun. 20, 1992; pp. 3438–3447.

Driessen et al.; "Novel integrated Optic Intensity Modulator Based on Mode Coupling"; Fiber and integrated Optics, vol. 13, pp/ 445–461.

Shuto et al; "Optical Intensity Modulators Using Diazo–Dye–Substituted Polymer Channel Waveguides"; IEEE Journal of Quantum Electronics, vol. 31, No. 8, Aug. 1995.

Erdogan; "Fiber Grating Spectra"; Journal of Lightwave Technology; vol. 15, No. 8; Aug. 1997.

Stegeman et al.; "Long–Range Surface Plasmons in Electrode Structures"; Appl. Phys. Lett.; 43(3), Aug. 1, 1993; pp. 221–223.

Kajenski; "Tunable Optical Fiber Using Long–Range Surface Plasmons"; Society of Photo–Optical Instrumentation Engineers; 36(5); 1537–1541; May 1997.

Caldwell et al.; "Surface–Plasmon Spatial Light Modulators Based on Liquid Crystal"; Applied Optics; vol. 31, No. 20; Jul. 10, 1992; pp. 3880–3891.

Anemogiannis et al.; "Optimization of Multilayer Integrated Optics Waveguides"; IEEE 1994; pp. 512–518.

Jung et al.; "Integrated Optics Waveguide Modulator Based on Surface Plasmon Resonance"; Journal of Lightwave Technology; vol. 12, No. 10, Oct. 1994; pp. 1802–1806.

Jung et al.; "Electro–Optic Polymer Light Modulator Based on Surface Plasmon Resonance"; Applied Optics; vol. 34, No. 6; Feb. 20, 1995; pp. 946–949.

Bonch–Bruevich et al.; "Surface Electromagnetic Waves in Optics"; Optical Engineering; vol. 31, No. 4; Apr. 1992; pp. 718–729.

* cited by examiner

| DISTORTION FIGURES OF SPW MODULATOR FOR A THREE TONE MODULATION |||||
|---|---|---|---|
| FIGURE OF MERIT | FREQUENCY TERMS i,j = 1,2,3 | LARGEST AMPLITUDE COEFFICIENT | AVERAGE POWER PER CARRIER POWER |
| CARRIER | $\omega_i$ | $C_1 M$ | 1 |
| SHD | $2\omega_i$ | $\frac{1}{2} C_2 M^2$ | $\left[\frac{1}{2}\frac{C_2}{C_1}M\right]^2$ |
| CSO | $\omega_i \pm \omega_j, i \neq j$ | $C_2 M^2$ | $\left[\frac{C_2}{C_1}M\right]^2$ |
| THD | $3\omega_i$ | $\frac{1}{4} C_3 M^3$ | $\left[\frac{1}{4}\frac{C_3}{C_1}M^2\right]^2$ |
| CTB | $\omega_1 \pm \omega_2 \pm \omega_3$ | $\frac{3}{2} C_3 M^3$ | $\left[\frac{3}{2}\frac{C_3}{C_1}M^2\right]^2$ |

FIG. 14

OPTICAL SURFACE PLASMON-WAVE COMMUNICATIONS SYSTEMS

BACKGROUND OF THE INVENTION

1. Field of the Invention

The present invention generally relates to optical communications systems, such as those used in telecommunications, and more particularly, to broadband or high speed digital communications systems of the type carrying information by the optical modulation of a light source via a surface plasmon wave device.

2. Description of Background Art

Optical communication systems are used with regularity today for many telecommunications systems. One such system of interest is the cable television system which is essentially a wired broadcast system, or point to multipoint system, which uses lightwaves over optical fiber cables to carry a broadband signal modulation. These systems modulate the laser light with 80–110 channels of programming with a signal which extends from about 50 MHz to about 1000 MHz or greater. In many systems, there is a reverse set channels in the band from 5 MHz to 50 MHz.

The optical communication systems of the cable television systems comprise a plurality of laser transmitters with a source frequency of either 1310 nm or 1550 nm which is modulated with the broadband signal which can be made up form a number of sources, such as satellite downlinks, terrestrial links, local programming, and UHF and VHF rebroadcasts. The modulated light is carried over optical fibers with perhaps some regeneration or amplification before being demodulated by an optical receiver at the other end of the optical fiber and thereafter distributed to a number of subscribers in a local geographic area around the receiver.

Because of the complexity of the broadband signal and its bandwidth, a common method for modulating the laser light is linear modulation of the intensity or amplitude of the light. This can be generally accomplished in one of two ways, either by direct modulation or by external modulation.

In direct modulation, a laser diode is biased with a current which is then mixed with the broadband signal to produce the intensity modulation. There are some problems with this technique including finding laser diodes with a linear current to light transfer characteristic. A very small percentage of predicable laser diodes can meet the stringent requirements for linearity, noise and output power which are needed in modern cable television systems. One solution has been to use less linear laser diodes but to compensate their nonlinearities by predistorting the broadband signal before direct modulation. While this concept has proven to be relatively effective, there are limits to the compensation as wider temperature range, operational power and bandwidth are required. Alternatively, external modulators, particularly of the Mach Zehnder (interferrometric) type have been utilized, where after a laser source signal has been generated, its optical output is modulated with a broadband signal applied to the external modulator. These systems however also produce nonlinearities in their transfer characteristics. In addition, there are inherent losses in the coupling of the source laser light to the modulator and its transmission through the modulator, thereby reducing effective operational power.

A surface plasmon wave (SPW) is an electromagnetic wave which propagates along the interface between two materials having dielectric constants of opposite signs, e.g., a metal and a dielectric layer. The polarization of a SPW is transverse magnetic (TM) and its electric field is perpendicular to the propagation interface. SPWs can be analyzed by techniques used for TM optical modes since they obey identical field equations and satisfy the same boundary conditions. Unique features of SPWs are that almost all of their energy is concentrated at the dielectric/metal interface and their propagation characteristics are very sensitive to environmental changes in their proximity.

Optical plasmon wave structures can be made by employing a device which couples an optical guided lightwave into a SPW. By controlling the amount of power coupling between the optical signal and the SPW, optical power may be dissipated producing an attenuation of the optical signal. If the amount of coupling is controlled electrically, a variable attenuator (modulator) device can be provided. Because of the extremely small interaction lengths needed, the optical plasmon wave modulator can be a very compact device which can be implemented as an integrated optics structure. This small size and other advantages of the device can produce substantial benefits with its use in the electronics and communications areas. One particularly advantageous plasmon wave modulator is disclosed in co-pending application Ser. No. 09/048,489, filed Mar. 26, 1998 in the name of E. Anemogiannis, and entitled " ", which application is assigned commonly with this present application. The disclosure of Anemogiannis is hereby incorporated by reference.

SUMMARY OF THE INVENTION

The invention provides novel broadband or high speed digital optical communications systems including a SPW modulator device.

In a first embodiment, a broadband communications system includes an optical transmitter coupled to an optical fiber communications link which carries an optically modulated light information signal to an optical receiver. In a first form, the optical transmitter includes a laser light source which is optically coupled to a SPW modulator which has been particularly adapted for analog broadband communications by selecting its transfer characteristic. A broadband electrical signal containing a plurality of information channels, for example CATV channels, is applied to the SPW modulator electrodes as the information signal. The modulation signal varies the power coupling of the guided laser light source signal into a SPW in the modulator and results in an intensity modulated optical signal which is output to the optical fiber for transmission to the optical receiver of the system.

Important advantages of the SPW modulator in this embodiment include its inherent linearity over previous devices, particularly external modulators such as the Mach Zehnder modulator. This provides a less complex system by lessening the necessity for predistortion circuits and other compensation techniques in some cases and reducing the complexity and precision of most others. In many applications, the external compensation for the device can be eliminated, or at least significantly reduced in most applications to provide less distortion and better over all performance. The low internal losses of the device permit average power lasers to effectively drive a SPW modulator and provide optical signals above the required communications link budgets. Additionally, the SPW modulator produces a low return signal because of its high directionality. This reduces the complexity of the laser transmitter by eliminating the need for an isolator between it and the light source to stabilize the laser. In addition, The small size of the SPW modulator is advantageous and allows it to be provided as integrated optical structures of relatively high densities.

In a second embodiment, an optical communications system includes a high power laser coupled to an optical splitter to divide its output power in two or more optical source outputs. Each optical source output is then used to drive an associated analog SPW modulator. Each of the modulators modulates its optical source signal with an information signal. After optical modulation, each modulated lightwave is coupled to a corresponding one of a plurality of optical fibers for transmission to one of a plurality of optical receivers. In this manner, several information signals can be communicated over the system using only one laser source. A net benefit from using one higher power laser, rather than several lower power ones, is one of cost, purity and similarity of the several signals. This configuration is also enhanced by the lower loss, higher linearity and other attendant advantages of the SPW modulators.

Additionally, for either the first or second embodiment a high speed digital optical communications system can be provided. The optical transmitter of either embodiment is optically coupled to one or more SPW modulators which have been particularly adapted for high speed digital communications. The first adaptation for high speed digital communications is made by selecting the transfer characteristic of the SPW modulator. The transfer characteristic of the SPW is modified for switching operation where a small change in bias voltage will cause a larger change in the transmittance of the device as compared to a linear SPW modulator. A second adaptation is the use of a high frequency modulation structure for the SPW modulator. A high speed multiplexed digital signal containing one or more information channels, for example digital telephony channels, is applied to the SPW modulator electrodes. The modulation signal varies the refractive index of an electro-optic layer of the modulator structure and thus the power coupling of the guided laser light source signal into a SPW in the modulator. The result is an intensity modulated optical signal which is output to the optical fiber link for transmission to the optical receiver of the system.

Still another embodiment of the invention preferably comprises a wavelength division multiplexing (WDM) optical communications system. An optical transmitter having a plurality of separate optical channels of different wavelengths is coupled to an optical fiber communications link which carries the wavelength division multiplex of optically modulated light signals to an optical demultiplexer and thereafter to individual optical receivers.

In a first preferred form of this embodiment, the laser transmitter comprises a plurality of laser sources emitting at different wavelengths and each coupled to an associated one of a plurality of SPW modulators. The outputs of the plurality of SPW modulators are combined in an optical wavelength combiner, preferably a WDM multiplexer/demultiplexer, to generate a WDM optical information signal for carriage over the optical link.

In a second preferred form of this embodiment, the optical transmitter, comprised of a wide band light source and having an output for generating a wide band of wavelengths, is demultiplexed by an optical divider, preferably a WDM demultiplexer or a Fabry Perot comb filter, into individual wavelengths which are each coupled to an associated one of a plurality of SPW modulators. The outputs of the plurality of SPW modulators are combined in an optical wavelength combiner, preferably a WDM multiplexer, to generate a WDM optical information signal for carriage over the optical link.

In a third preferred form of this embodiment, the laser transmitter comprised of a plurality of laser sources emitting at different wavelengths with each coupled to an optical wavelength combiner, preferably a WDM multiplexer, to generate a WDM optical source signal. The optical channels in the optical source signal are modulated by coupling the source signal to a plurality of serially cascaded SPW modulators. Each modulator is designed to be wavelength sensitive for its particular channel and modulates its optical carrier without significantly affecting the other optical carriers. After full modulation through the series connected modulators, a WDM modulated optical information signal is generated for carriage over the optical link.

In a fourth preferred form of this embodiment, the optical transmitter comprises a light source having an output generating a wide band of wavelengths to generate a WDM optical source signal. The optical channels of the optical source signal are modulated by coupling the source signal to a plurality of serially coupled SPW modulators. Each modulator is produced as wavelength selective for its particular channel and modulates its optical carrier without significantly affecting the other optical carriers. After full modulation through the series cascaded modulators, a WDM modulated optical information signal is generated for carriage over the optical link.

Because the SPW modulators can be tailored for either analog or digital modulation, the modulation for this embodiment can be all digital, all analog, or a combination of both. An optical channel can be open to both types of modulation or dedicated to one type. If the optical channels of the system are dedicated to all analog modulation or all digital modulation, then the SPW modulators are tailored by their transfer characteristics to be particularly adapted for the type of modulation chosen. Optionally, if there are both dedicated digital and dedicated analog optical channels in the system, then each modulating device is tailored for the type of signal of its channel. Moreover, for optical channels that must carry both types of signals, the SPW modulators for those channels can be tailored for optimally modulating both types of signals.

For the modulation process in an optical communications system, the SPW modulator is superior to the direct modulated systems in that it is an external modulator and therefore reduces or eliminates chirp because the optical source can be held in the narrow linewidth, steady state CW mode. Additionally, operating a laser or other source in a CW state does not require the source driving circuitry to have complicated feedback loops to optimize the threshold bias current over all conditions.

The SPW is also superior in performance in many categories to the conventional external modulators used in optical communications systems today. For example, a critical parameter of long distance optical communications is the power handling capability of the optical transmitter. The higher the power which can be initially launched into a fiber link, the easier it is to recover the modulated information on the optical carrier and the farther the information can be transmitted without need of replication. Many Mach-Zehnder (MZ) external modulators are limited to between 100–200 mW of input power because of the way they are constructed. The Lithium Niobate waveguides in these devices are not capable of handling optical power over these limits. Most electroabsorbtive external modulators are even more limited in their optical power carrying capabilities. The fiber integrated SPW modulator on the other hand uses an optical fiber as its waveguide for the optical carrier in the guided mode. The operation of the SPW modulator is based on coupling power away from the guided mode by transforming all or a portion of the guided wave power into a high loss SPW. The limit on the input optical power to a SPW modulator is therefore the limit on the power capability of the optical fiber which is could be several Watts or more.

Another of the parameters important in optical communications is return loss, which causes some of the transmitted light to be reflected back at the source. This effect is exacerbated at interfaces and mismatches where the index of refraction changes. If there is enough light reflected from the modulator, particularly if the source is a laser diode of the DFB type, the source may become unstable. This must usually be remedied by installing an expensive isolator between the external modulator and the light source. MZ modulators have angled light couplers to assist in matching to the optical fibers of the communications systems to the waveguides of the device. However, because the index of refraction of the material of the waveguide (lithium niobate) is different from the index of refraction of the optical fiber, there will always be some inherent mismatch which will cause return loss. The fiber integrated SPW modulator as previously noted uses an optical fiber as its waveguide for the optical carrier in the guided mode which has the same refractive index as the communications system optical fiber. The planar integrated SPW modulator may use a silicon diffused waveguide for the optical carrier in the guided mode which has the same refractive index as the communications system optical fiber. Therefore, there is essentially no optical return loss in a SPW modulator because there is no refractive index mismatch between the optical fiber link and the modulator. Also, the optical fiber waveguide of the fiber integrated SPW modulator can be coupled to other optical fiber of the optical communications system with substantially no reflection by fusion bonding thereby eliminating any optical couplers which greatly contribute to this problem. Additionally, the silicon diffused waveguide of the planar integrated SPW modulator can be coupled to other optical fiber of the optical communications system with substantially no reflection by fusion bonding thereby eliminating any optical couplers which greatly contribute to this problem.

Still another issue related to optical mismatches in the coupling of light through an external modulator is the through loss for the device. The through loss of a device is the optical power lost from input to output before modulation. An external modulator which has a lower through loss has a decided advantage of requiring less input power for the same output power. Because of the refractive index mismatch between the crystalline material of the waveguide of the MZ modulator which is LiNbO$_3$ and the optical fiber and the optical couplers necessary to match the light from one to the other, the MZ modulator will inherently have more through loss than the optical fiber waveguide design of the fiber integrated SPW modulator or the diffused silicon waveguide design of the planar integrated SPW modulator. However, beyond this material caused through loss, the interferrometric designs also have much higher losses because they must split the optical power into two channels and then recombine them, a process which also causes through loss. This causes through losses of around 4.0–4.5 dB for even the best Mach-Zehnder designs without much chance of lowering them. With the SPW modulator designs, through losses of less than 1 dB are very feasible.

Generally, the SPW modulator shows higher linearity and less distortion than the MZ modulator for analog modulations, such as complex broadband information signals of the CATV system type. This is because the intensity modulation of the SPW device is caused by a change in the power coupling coefficient between the guided wave and the SPW. The power coupling coefficient is controlled by the change in refractive index of an electro-optic layer in contact with a metal layer which supports the SPW generation. Therefore, the coupling coefficient variation is directly caused by the electrical modulation signal and produces a fairly linear intensity modulation transfer characteristic. To operate efficiently, a linearized modulator is often operated at a bias point where second order distortion is zero. Without accurate control of the bias point, the second order distortion will become unacceptable at bias excursions not far from the zero second order distortion point. The MZ modulator has a transfer function which is a periodic sinusoid function because of the interference phenomenon with which it operates. Nearing the ends of the transfer function, the nonlinearity of the sinusoidal transfer function of the Mach-Zehnder modulator becomes more and more pronounced. Because most linearized MZ modulators operate at a zero bias point for second order distortion, they generally will require third order predistortion.

To compare the SPW modulator quantitatively with the MZ modulator for linearity is difficult but some qualitative generalizations can be made. Because of its non-periodic transfer function, the SPW modulator second order harmonic distortion is as good over small modulation excursions as a MZ modulator and becomes much better than the MZ modulator the larger the modulation index becomes. The generalization can also be made for the combination of higher order harmonics. Moreover, the SPW modulator does not exhibit some distortions found only in the MZ modulator because of its crystalline structure. Because there is a transition to a crystalline structure, LiNbO$_3$, from the optical fiber, stimulated Brillouin scattering is an issue in MZ modulators but is not an issue in SPW modulators. Chirp, although reduced in MZ modulators, is still an issue but is not an issue in SPW modulators.

Still further, the integrated SPW modulator is not as temperature sensitive as other external modulators. The interaction length of the plasmon wave coupling is very short and therefore does not need temperature stabilization like the longer interaction devices such as the MZ modulator. This aspect permits the SPW modulator to be used in somewhat hostile ambient environments where other modulators would require expensive temperature compensation schemes. Such environmental ruggedness allows the SPW modulator to be used remotely from the source which can then be in a more protected area, for example, the controlled environment of the headend of a CATV system.

These and other objects, aspects and features of the invention will be more clearly understood and better described when the following detailed description is read in conjunction with the attached drawings, wherein:

BRIEF DESCRIPTION OF THE DRAWINGS

FIG. 14 is a tabular representation of the distortion products for the transfer function illustrated in FIG. 13;

DETAILED DESCRIPTION OF A PREFERRED EMBODIMENT

Figure 1:
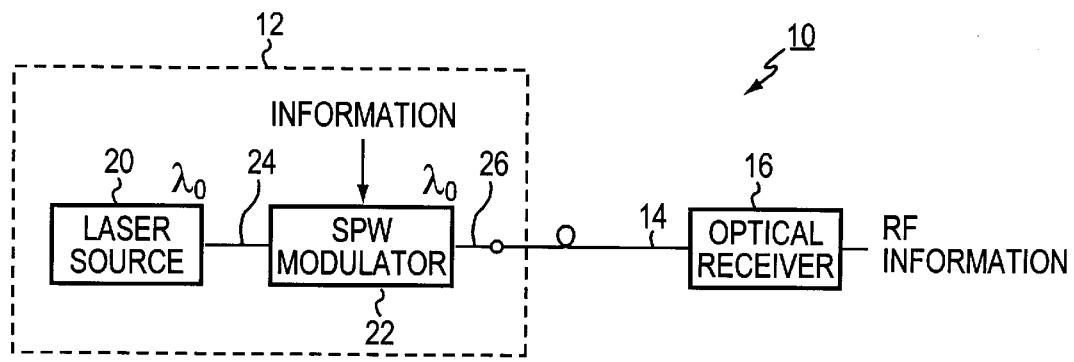
FIG. 1 is a system block diagram of a first embodiment of an optical communications system constructed in accordance with the invention.

In FIG. 1 there is shown the advantage of an optical communications system 10 constructed in accordance with the invention. The system is a broadband communications system which will be described as particularly adapted to the cable television broadcasts, but it will be evident that the invention can be used with this and many other types of communications systems. Typically, such a broadband communications system will include at least one laser transmitter 12 coupled to a length of optical fiber 14. The length of the optical fiber 14 forming an optical communications link is generally between 5–20 km. and is of a single mode construction, normally having a specified loss at 1310 nm. and 1550 nm. Also, there may be optical regenerators spliced into the construction of the link, for example EDFAs. The laser transmitter 12 produces light modulated with a broadband information signal which is carried over the fiber link 14 to an optical receiver 16. The optical receiver 16 detects and/or demodulates the optical signal back into a broadband RF signal which can then be distributed to subscribers of the CATV system in the locality of the optical receiver.

Preferably, the laser transmitter 12 comprises a source laser 20 and a SPW modulator 22 that has been particularly adapted for linear operation as will be more fully described herein. The source laser for a communications system as shown can be a DFB laser diode having a wavelength of 1310 nm. and 15 milliwatts of output. A commercial device meeting these specifications is a laser diode having a part number FU-45SDF-3M76 made and distributed by Mitsubishi Electronics of California. The source laser 20 produces essentially a CW light frequency at 1310 nm. which is input to the SPW modulator 22 through an optical fiber fusion splice 24. The SPW modulator 22 modulates the source light with a broadband information signal applied to a set of modulator electrodes integral to the device. The modulated light signal is output to the optical fiber 14 through a fusion splice 26.

Normally, for a CATV system the optical transmitter 12 would be located at the headend of the system and the fiber link 14 extend to a serving area node where the optical receiver 16 would be located. If the information signal is digital, then a typical use of the system 10 would be to form one or more of the connecting links in a SONNET ring. Many other configurations using this building block system 10 are also known. Because the SPW modulator 22 does not exhibit extensive insertion losses, the laser power can be reduced in a typical situation by 30% in comparison to MZ modulators. Further, the isolator normally used to prevent the reflections from a modulator from destabilizing the source laser may be eliminated. The linearity of the SPW device for the analog application is necessary because of the complexity of the broadband information signal which is used in a CATV system. An analog broadband signal is used extensively in CATV applications to broadcast programming to subscribers of a system.

Figure 1A:
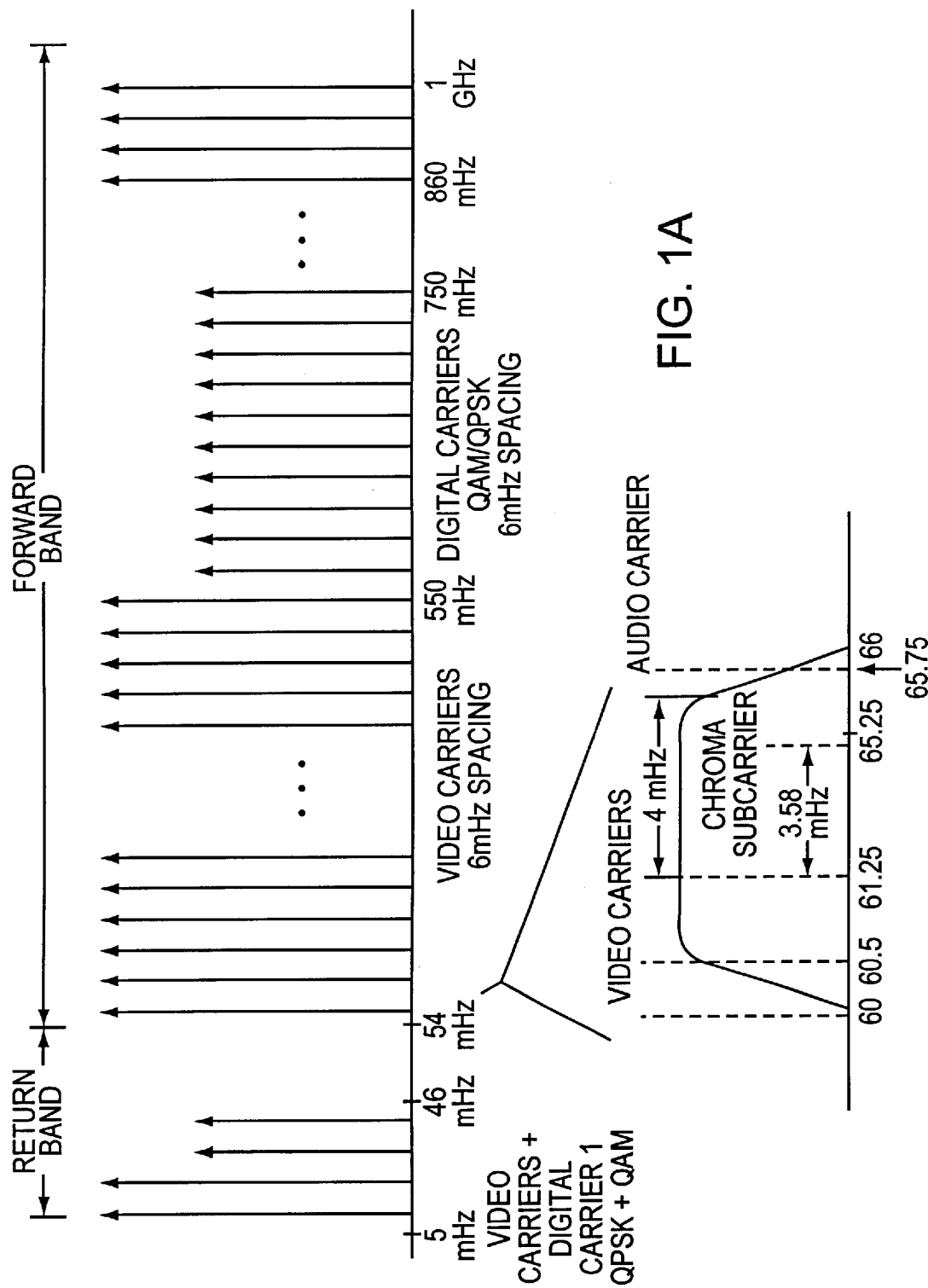
FIG. 1A is a pictorial representation of the frequency spectrum of a broadband information signal particularly adapted for use in a CATV optical communications system.

The broadband signal for CATV systems shown in FIG. 1A is generally between 50 MHz to 1000 MHz and termed the forward band. Between 50 MHz and 550 MHz and divided into 6 MHz channels, the channels generally carry analog television programming. Each television channel in the United States is a high frequency carrier that is amplitude modulated with a NTSC formatted video signal of 4.0 MHz in bandwidth with a associated audio signal frequency modulated on a carrier 4.5 MHz above the video carrier. Above 550 MHz., digital, data, telephony, and other specialized channels can be grouped. The modulation of these specialized channels are diverse but are always the modulation of a carrier. Digital signals may be direct modulated or some variation of analog QPR, QPSK, or NQAM. These specialized channels, although not uniform in bandwidth, are usually grouped into 6 MHz segments for convenience. Therefore, the spectrum is many analog channels of frequency division multiplexed carriers over a broad bandwidth.

If the transfer characteristic of the SPW modulator is not linear, then this complex signal will create many distortions at harmonics of the signals and cross modulation products caused by the mixing of the different carriers when modulating the optical carrier. The SPW modulator 22 may be specifically tailored to have a linear transfer characteristic to alleviate that distortion as will be more fully described hereafter. It should also be evident that a digital signal can be used to modulate the optical carrier for the system illustrated in FIG. 1. The SPW modulator 22 may be specifically tailored to have a transfer characteristic which is advantageous for digital modulations as will be more fully described hereafter.

Figure 2:
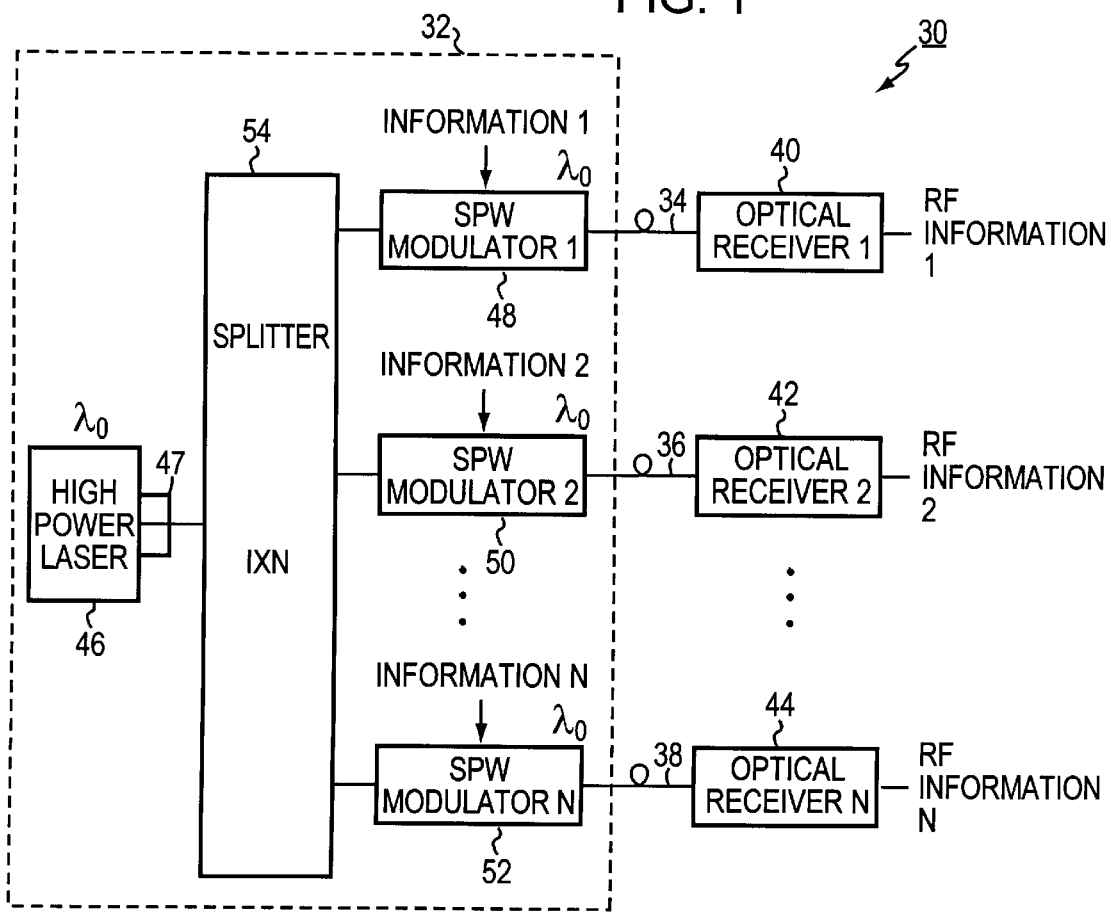
FIG. 2 is a system block diagram of a second embodiment of an optical communications system constructed in accordance with the invention.

A second embodiment of an optical communications system 30 constructed in accordance with the invention is illustrated in FIG. 2. The system 30 includes a laser transmitter 32 having a plurality of outputs, each of which are connected to a corresponding optical fiber links 34, 36, and 38. Each of the optical fiber links 34, 36 and 38 is similar to the optical fiber described for the first embodiment and couples to a corresponding receiver 40, 42, and 44. The laser transmitter 32 includes a high power laser source 46, optionally an optical isolator 47, and a plurality of SPW modulators 48, 50 and 52. Each of the modulators are associated with the one of the outputs of the laser transmitter and one of the optical fibers 34, 36 and 38. The laser source 46 is a high power laser source whose power is divided into several equal parts by an optical splitter 54 which couples each part into the input of a respective SPW modulator. As an example a 1310 nm. 1×4 fused single mode star splitter with a part number 23-403-31-14-01301 made by Gould, Inc. of Millersville, Md. could be used. In this manner, several information signals, which can be analog or digital, can be transmitted to different local areas or several signals to the same area. It is evident that the information modulated on the separate light signals can be the same or different signals.

Figure 2A:
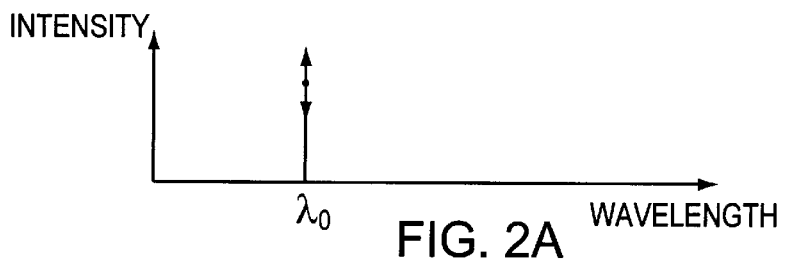
FIG. 2A is a pictorial representation of the intensity modulated optical carrier produced by the optical communications systems illustrated in FIGS. 1 and 2.

FIG. 2A is representative of the optical information signal produced by the system implementations illustrated in FIGS. 1 and 2. The optical information signal comprises an optical carrier at wavelength $\lambda_0$, the same wavelength as the source. This optical carrier is intensity modulated which permits less complex transmission and demodulation schemes in the remaining portions of the system.

Figure 3:
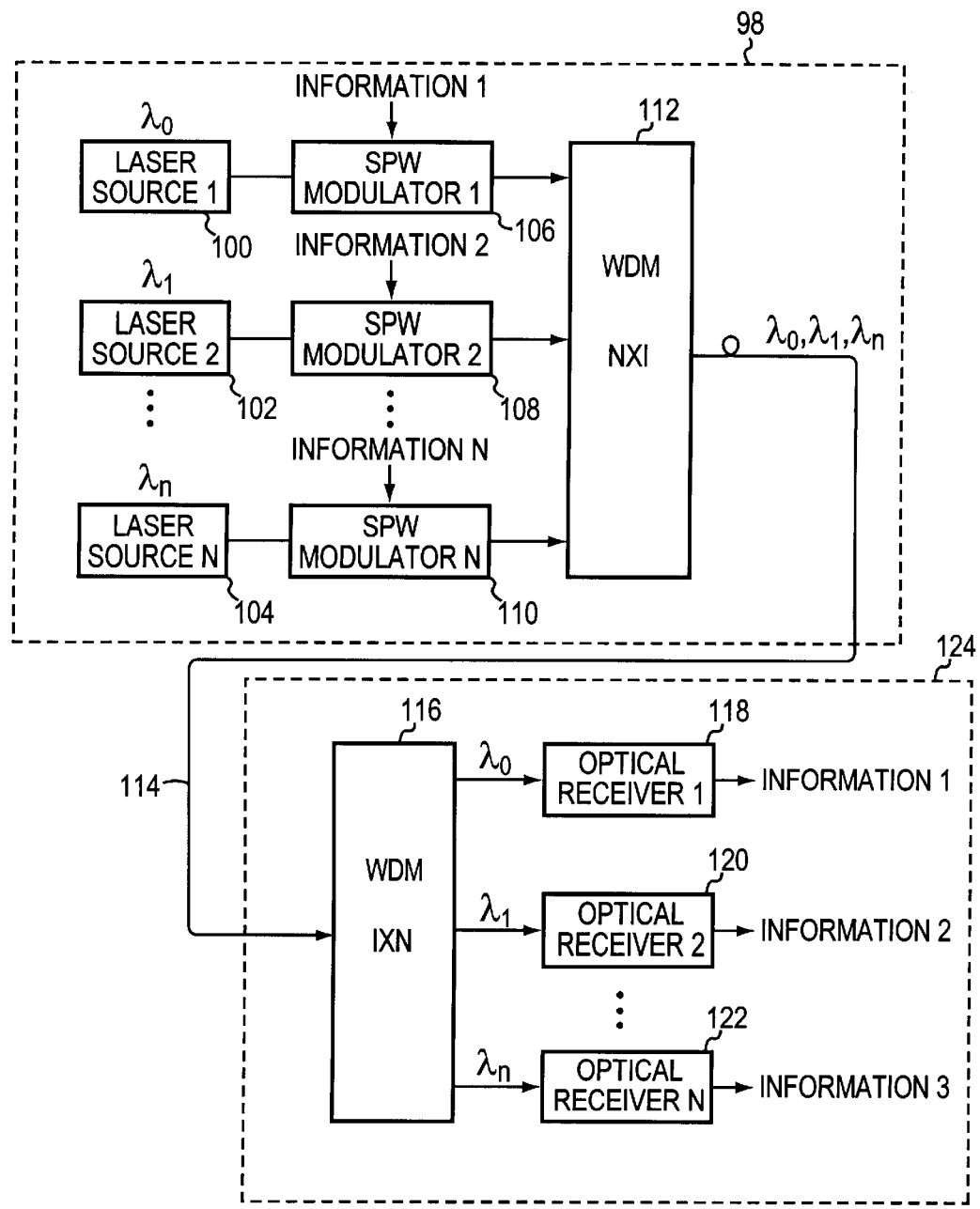
FIG. 3 is a system block diagram of a first form of a WDM optical communications system constructed in accordance with the invention.

With reference now to FIG. 3, another preferred embodiment of an optical communications system constructed in accordance with the invention is shown. The communications system comprises a laser transmitter 98 which generates a WDM optical information signal having a plurality of optical carriers at different wavelengths. The carriers are modulated by information signals 1–N and carried over a single fiber link 114 to an optical receiver group 124. In the optical receiver group 124 the WDM optical information signal is separated or demultiplexed, detected and/or demodulated into the corresponding information signals that were originally used to modulate the carriers. This allows a single optical communications link 124 to carry more information by the wavelength division multiplexing of the optical carriers.

FIG. 3 shows a first form of this embodiment where the laser transmitter comprises plurality of laser sources 100, 102 . . . 104, each emitting a separate CW optical source signal of light at different wavelengths, $\lambda_0, \lambda_1 \ldots \lambda_n$. The optical source signals form independent optical channels of a particular line width which are modulated by coupling the laser sources 100, 102 . . . 104 to associated SPW modulators 106, 108 . . . 110, respectively. Each of the external SPW modulators 1–N has an modulation and bias circuit (information 1–N) connected to its electrical input terminals to cause the intensity modulation of the corresponding optical carrier. The plurality of modulated optical information signals output from the modulators 106, 108 . . . 110 are combined into a WDM optical information signal by wavelength division multiplexing them in an optical combiner 112, preferably implemented as a N×1 WDM multiplexer. Many commercially available optical WDM multiplexers can be directly connected to a fiber output which is advantageous in interfacing the laser transmitter 98 to the optical link 114.

Figure 3A:
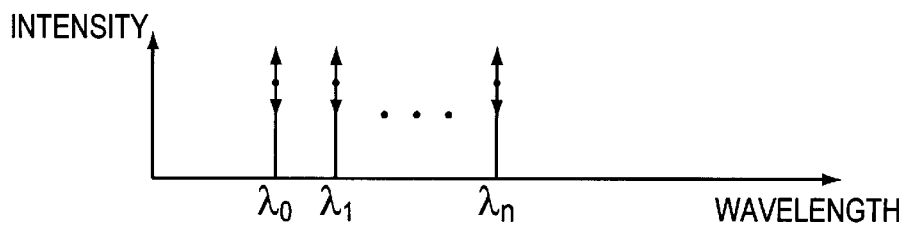
FIG. 3A is a pictorial representation of the WDM intensity modulated optical carriers produced by the optical communications systems illustrated in FIGS. 3, 4, 5 and 6.

A representation of the WDM optical information signal is shown in FIG. 3A. the plurality of modulated optical carriers at wavelengths $\lambda_0, \lambda_1 \ldots \lambda_n$, are spaced apart in the wavelength spectrum by guard bands of greater or equal to 0.8 nm. The optical carriers are typically modulated to a modulation index of 3.0%–4.0% for the CATV application. Other systems will have different operating parameters based upon their applications. Because of the nature of the SPW modulators, the modulation for this embodiment can be all digital or can be all analog, or a combination of both. An optical channel can be open to both types of modulation or dedicated to one type. If the optical channels of the system are dedicated to all analog modulation or all digital modulation, then the SPW modulators may be tailored by their wavelength and transfer characteristics to be particularly adapted for the type of modulation chosen. Optionally, if there are both dedicated digital and dedicated analog optical channels dedicated in the system, then each modulator device 1–N may be tailored for that type of signal. Moreover, for optical channels which must carry both types of signals, the SPW modulators for those channels can be tailored for optimally modulating both types of signals.

The WDM optical information signal is optically coupled to the fiber 114 at its sending end and is carried to the receiving end of the fiber at the optical receiver group 124. The receiver group 124 comprises a plurality of optical receivers 188, 120 . . . 122 attached to the respective output ports N of an WDM demultiplexer splitter 116 whose input is the from optical fiber 114. At the receiver group 124, the WDM optical information signal is demultiplexed by the wavelength sensitive optical splitter 116, preferably a 1×N WDM demutiplexer, into N optical information signals having optical carriers at $\lambda_0, \lambda_1 \ldots \lambda_n$. The demultiplexer outputs are coupled to the respective optical receivers 188, 120 . . . 122, and each receiver is particularly adapted to detect and demodulate its intensity modulated optical carrier to recover the information signal from the particular optical communications channel. FIG. 3A is representative of the optical information signal produced by the system implementations illustrated in FIGS. 4–6. The optical information signal comprises a plurality of optical carriers at wavelengths $\lambda_0, \lambda_1 \ldots X_n$, the same wavelengths as the sources. These optical carriers are intensity modulated which permits less complex transmission and demodulation schemes in the remaining portions of the system.

Figure 4:
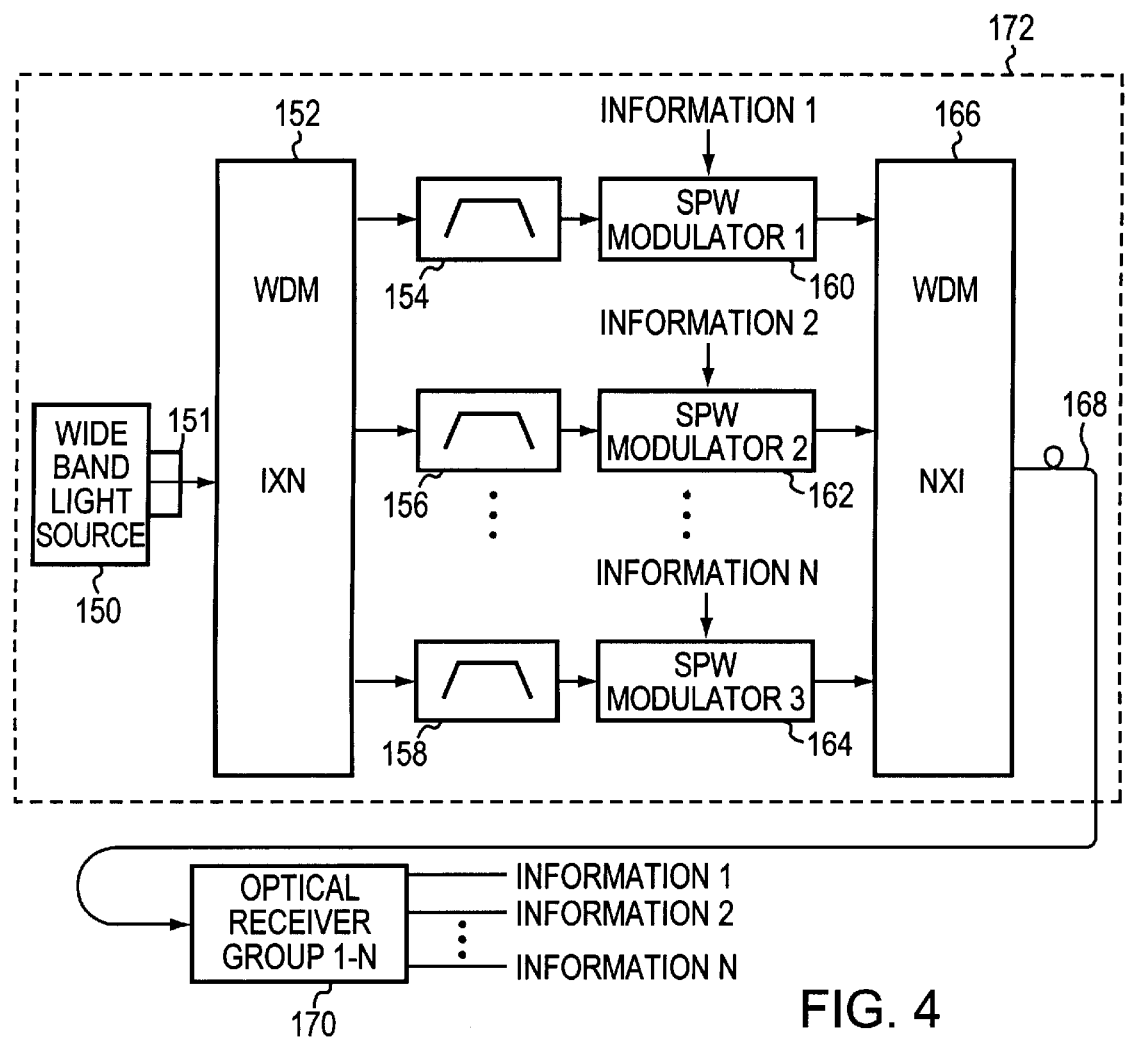
FIG. 4 is a system block diagram of a second form of a WDM optical system constructed in accordance with the invention.
Figure 4A:
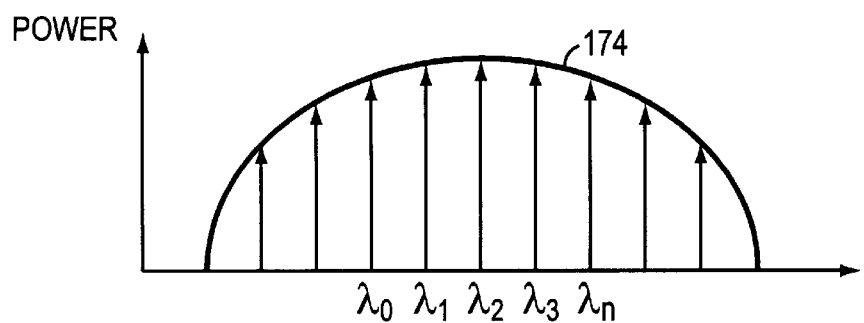
FIG. 4A is a pictorial representation of the optical power distribution for the wide band optical source of the optical communications systems illustrated in FIGS. 4 and 6.

Still another form of this embodiment of a WDM optical communications system is shown in FIG. 4. In this second form, a wide band light source 150 has been substituted for the plurality of laser sources of the first form. The wide band light source 150 is preferably an amplified spontaneous emission laser (ASE), multimode fiber laser, or LED having a broader spectrum of light emission than the individual laser sources of the prior example. As illustrated in FIG. 4A, the spectrum of the wide band light source 150 can be viewed as a continuous power distribution of the light as a function of wavelength or as a plurality of optical carriers each having an average optical power and separated from others in wavelength.

Particular wavelengths can be chosen from this power distribution to provide individual optical carriers at wavelengths $\lambda_0, \lambda_1 \ldots \lambda_n$. The carrier selection from the generated spectrum distribution of the wide band source 150 can be accomplished by a number of methods. The source output can be split by an optical splitter 152 and, after being filtered, the individual portions input directly to a plurality of corresponding SPW modulators 160, 162 . . . 164. Alternatively and as preferably illustrated, the optical spectrum can be demultiplexed by a 1×N WDM optical demultiplexer 152 into the separate wavelengths. Which configuration is used is a design consideration involving a cost/performance trade off. The typical optical power splitter will cause a power split and a consequent reduction in optical power in each leg thereby pragmatically limiting the number of optical channels. The frequency sensitive demultiplexer does not have as much attenuation per channel as a power splitter, but it is more complex and costly.

The plurality of optical carriers are then input to a plurality of SPW modulators 160, 162 . . . 164. optionally, optical notch filters interposed between the multiplexer 152 and the modulators 160, 162 . . . 164 may be used to narrow the optical carriers from the source 150. After reaching the SPW modulators 160, 162 . . . 164, the optical carriers $\lambda_0$, $\lambda_1 \ldots \lambda_n$, are modulated with the information signals 1–N, respectively, in the manner described previously. The individual modulated optical information signals output from the modulators 1–N are then combined into an WDM optical information signal by a N×1 WDM multiplexer 166 and transmitted over fiber 168 to receiver group 170. The optical fiber 168 and the receiver group 170 can be implemented similarly to those components shown in the first form of this embodiment.

Figure 5:
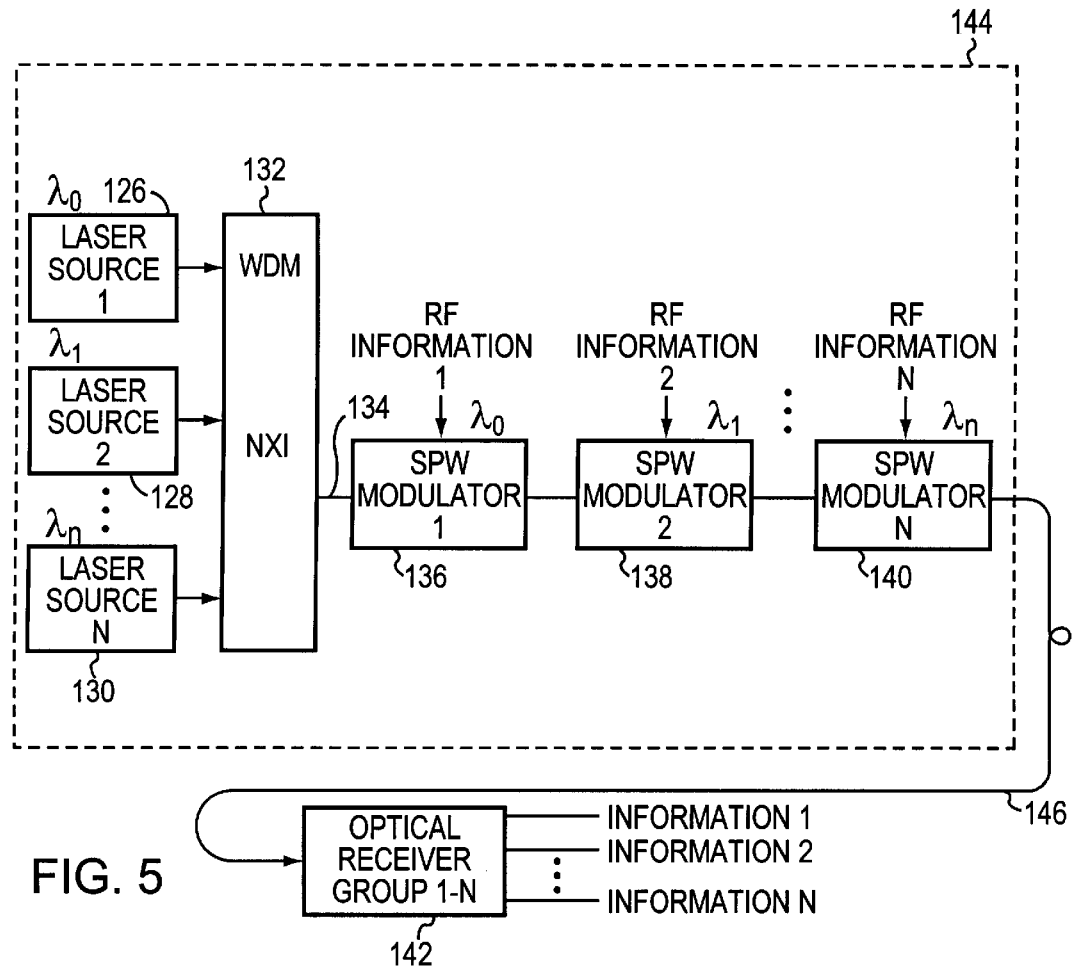
FIG. 5 is a system block diagram of a third form of a WDM optical system constructed in accordance with the invention.

With reference now to FIG. 5, a third preferred form of the embodiment of an WDM optical communications system constructed in accordance with the invention is shown. The communications system comprises a laser transmitter 144 which generates a WDM optical information signal having a plurality of optical carriers at different wavelengths. The carriers are modulated by information signals 1–N and transmitted over a single fiber link 146 to an optical receiver group 142. In the optical receiver group 142 the WDM optical information signal is separated or demultiplexed, detected and/or demodulated into the corresponding information signals 1–N that were originally used to modulate the optical carriers. The optical fiber 146 and the receiver group 142 can be implemented similarly to those components shown in the first form of this embodiment.

The laser transmitter 144 comprises a plurality of individual source lasers 126, 128 . . . 128 which are connected to the inputs of a N×1 WDM multiplexer 132. The source lasers 126, 128 . . . 128 are run in a CW mode and output a plurality of optical carriers at wavelengths $\lambda_0, \lambda_1 \ldots \lambda_n$. The optical carriers are combined in the multiplexed 132 to form an unmodulated WDM optical information signal. The individual carriers of the unmodulated WDM optical information signal are modulated in turn with information 1–N by a plurality of SPW modulators 136, 138 . . . 140 cascaded in series. Because of the low insertion loss of each SPW modulator and its wavelength selectivity, where only a particular narrowband of wavelengths is modulated and other wavelengths are passed unaltered, the modulators 136, 138 . . . 140 can be easily cascaded in a serial fashion. After modulation by passing the WDM optical information signal through all of the modulators, it is coupled into the optical fiber link 146. This configuration takes advantage of the particular characteristics of the SPW modulator where it can be integrated on a chip. Specifically, all N modulators can be implemented on a single optical chip. The insertion loss is minimized because there will only be one fiber or waveguide with no splices or breaks to cause reflection or other imperfections.

FIG. 3A illustrates the manner in which the transfer functions of the separate modulators are separated by their wavelength selectivity but do not substantially influence other wavelengths outside a small band. This produces a comb of modulator transfer functions with which to WDM modulate a plurality of optical carriers at the resonance frequencies of the modulators. It is noted that other optical carriers can be mixed in the WDM and not be affected by the modulation. This can be very advantageous if there were a need to transmit one or more open channels which were then intended to be modulated downstream.

Figure 6:
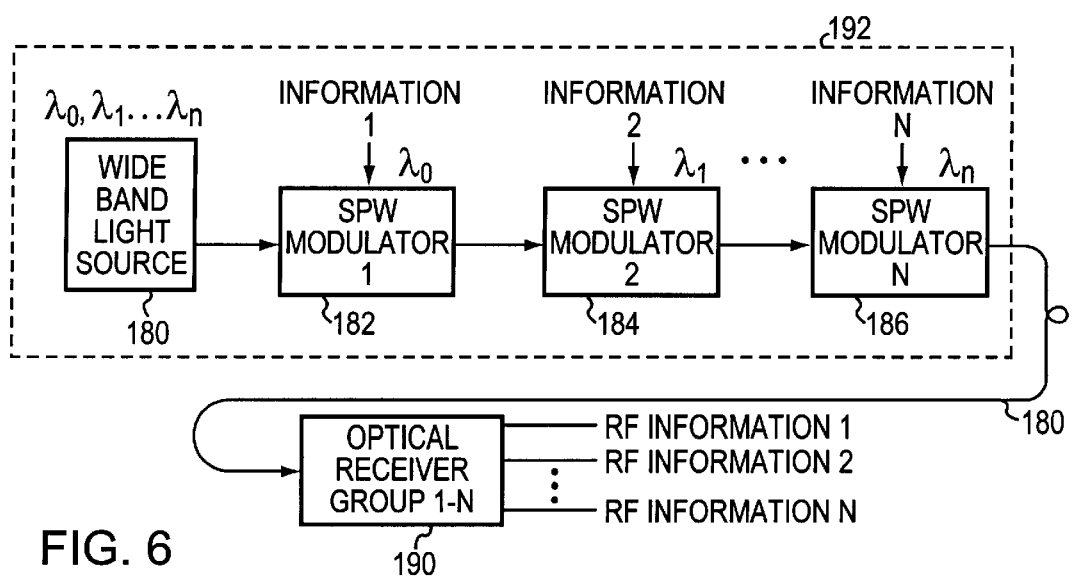
FIG. 6 is a system block diagram of a fourth form of a WDM optical system constructed in accordance with the invention.

With reference now to FIG. 6, a third preferred form of the embodiment of an WDM optical communications system constructed in accordance with the invention is shown. The communications system comprises a optical transmitter 192 which generates a WDM optical information signal having a plurality of intensity modulated optical carriers at different wavelengths. The carriers are modulated by information signals 1–N and carried over a single fiber link 180 to an optical receiver group 190. In the optical receiver group 190 the WDM optical information signal is separated or demultiplexed, detected and/or demodulated into the corresponding information signals 1–N that were originally used to modulate the optical carriers. The optical fiber 180 and the receiver group 190 can be implemented similarly to those components shown in the first form of this embodiment.

The optical transmitter 192 comprises a wide band light source 180 coupled in series to a plurality of SPW modulators 182, 184 . . . 186. The wide band source generates a power distribution of optical carriers at wavelengths $\lambda_0$, $\lambda_1 \ldots \lambda_n$ and the SPW modulators modulate these carriers in turn with information 1–N. The resulting modulated WDM optical information signal is then coupled into the optical fiber 180 for carriage to the receiver group 190. This design has the advantages of both of the forms of the WDM embodiment shown in FIGS. 4 and 5 in that it utilizes the series cascaded modulators and a single wide band light source to generate the WDM optical information signal. In addition, there is no need for a WDM multiplex or power splitter. As with the previous cascaded example, all N modulators may be integrated on the same optical chip with a common input/output fiber or a common input/output waveguide.

Figure 7:
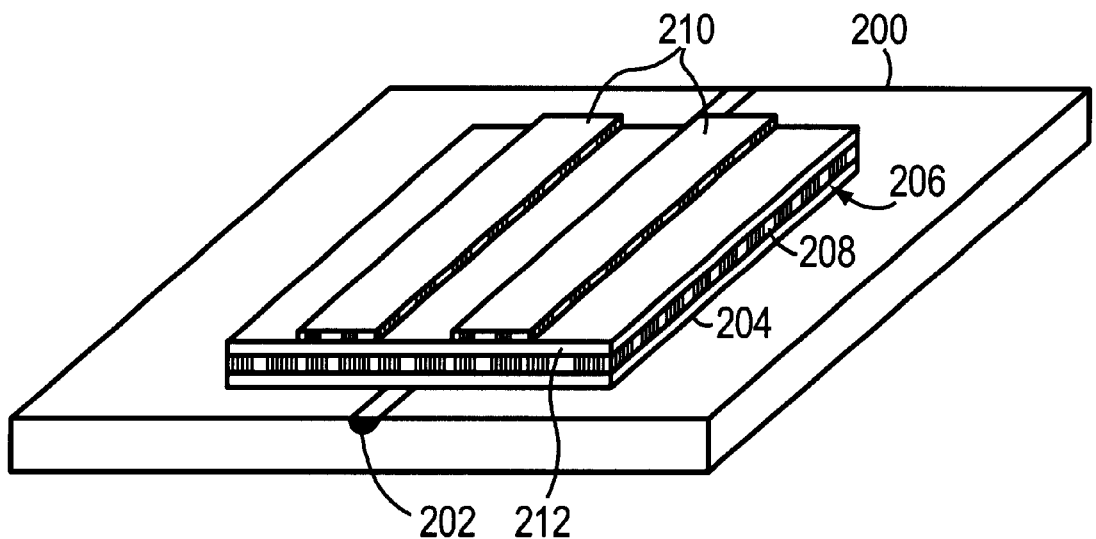
FIG. 7 is perspective view of an planar integrated optics SPW modulator which can be utilized in the systems illustrated in FIGS. 1–6.

The SPW modulators illustrated in the previous systems can take many forms but are characterized by the controlled power coupling of a guided light wave into a SPW which produces intensity modulation of the guided wave. Particularly useful are embodiments of integrated optics SPW modulators. In FIG. 7, a preferred implementation of a planar integrated optics SPW modulator useful in the systems of FIGS. 1–6 is illustrated. A substrate material 200 can constitute an optical crystal, such as Lithium Niobate, optical glass, semiconductor, etc., in which an optical channel waveguide 202 is formed by doping the channel, vapor deposition or other suitable process. Preferably for optical communication systems, the substrate 200 is silicon because of its good mechanical properties. In addition, a waveguide 202 can be diffused into the silicon which has an index of refraction which is the same as optical fiber. This is an important aspect in the matching of the components of the system to minimize through loss and beck reflection. The optical waveguide 202 forms the guiding layer for the modulated light of the structure. After the deposition of an additional buffer layer 204, a modulator structure 206 is positioned at the top of the channel waveguide 202. The positioning is such that a metal layer 208 is in optical contact with the buffer layer 204. An application of a voltage on the modulator electrodes 210, causes the refractive index variation of an EO layer 212 which is in direct optical contact to the metal layer 208. The EO layer index variation perturbs the SPW wavevector from its quiescent value and alters the power coupling coefficient between the SPW and the guided wave. This power coupling variation causes the intensity of the transmitted guided light in the waveguide 202 to be proportional to the voltage applied to the electrodes 210. Further embodiments include structures where the planar SPW modulator has an optical grating to assist in the wavevector matching. In these instances a surface relief grating may be formed on the top of the optical waveguide 202 before the modulator structure 206 is mounted thereon, or an index grating may be formed inside the optical waveguide 202.

The modulator structure 206 which is capable of varying (modulating) the coupling between the SPW and the guided lightwave electrically is added to the SPW launching structure. This planar integrated modulator structure is designed independently of the SPW generation and support structure and is located in optical contact with the single or multiple metal layers 208 of that structure which supports the SPW. The modulator structure 206 is comprised of the EO layer 212, preferably Polymers, Lithium Niobate, Titanium Niobate or Gallium Arsenide, in direct optical contact to the metal layer 208 which is responsible for the generation and propagation of the SPW in both the planar and cylindrical geometries. As has been described previously, the metal layer 208 may reside on the top of optional buffer layer(s) 204. The optional buffer layer(s) have a dual purpose. First they isolate the guided lightwave which propagates in the guiding layer 202 from the metal layer 208 reducing the insertion loss of the device. Second the buffer layer(s) 204 may be used for setting the optical structure to the matching state $K_{spw}=K_g$ when there is no grating. $K_{spw}$ and $K_g$ represent the wavevectors of the SPW and the guided mode wave, respectively. The matching condition is modified to $K_{spw}K_g \pm N K_G$, preferably N=1, when there is a grating in the optical structure.

The refractive index of the EO layer 212 varies with the application of a voltage at the electrodes 210 located on the top side of the EO layer. The electrodes 210 form a coplanar waveguide (CPW) or a asymmetric coplanar waveguide (ACPW) which can be driven by modulating frequencies up to 40 GHz. or higher. Assuming a voltage is applied to the electrodes 210, the refractive index change of the EO layer is given as:

$$\Delta n = 0.5 n^3 r \Gamma V/d$$

where n is the refractive index of the EO layer when V=0, d is the electrode separation; r is the EO coefficient for the particular EO material, and $\Gamma \approx 0.5$ is a factor for the imperfect overlap between the electric field dynamics lines and the EO layer. An alternative electrode configuration would be to position a set of electrodes on the sides of the EO layer 212. The electric field lines of this configuration more efficiently change the refractive index of the EO layer 212, i.e., the factor $\Gamma$ is closer to 1.

The SPW modulator structure design involves two steps which includes the determination of the optimum thickness of the modulator layers, the EO layer and the electrode layers, and the length of the modulator. Optimum layer thicknesses are necessary for efficient modulation, i.e., small modulation voltages, low bias voltage, large modulation depth, and minimal insertion loss. The modulator length is also an important performance parameter since a modulator longer than the optimal length has reduced obtainable modulation depth and high insertion loss, while a modulator length less than the optimum decreases the attainable modulation depth and the output light extinction ratio. The thicknesses of the modulator structure layers may be determined by the method set forth in the previously referenced publication by Anemogiannis, et al. The length of the modulator structure may be determined by the method set forth in the previously referenced publication by Driessen, et al.

A microstrip modulator structure which may also be used with this and the other embodiments of the invention is shown in *Optical Intensity Modulator Using Diazo-Dye-Subsitituted Polymer Channel Waveguide* by Shute, et al. in *IEEE Journal of Quantum Electronics,* Vol. 31, No. 8, August 1995. The disclosure of Shute, et al, is incorporated by reference. These high bandwidth modulator structures are preferred to handle broadband analog signal and high speed digital signals. Lower bandwidth analog signals and slower digital signals may use slower modulation structures.

Figure 8:
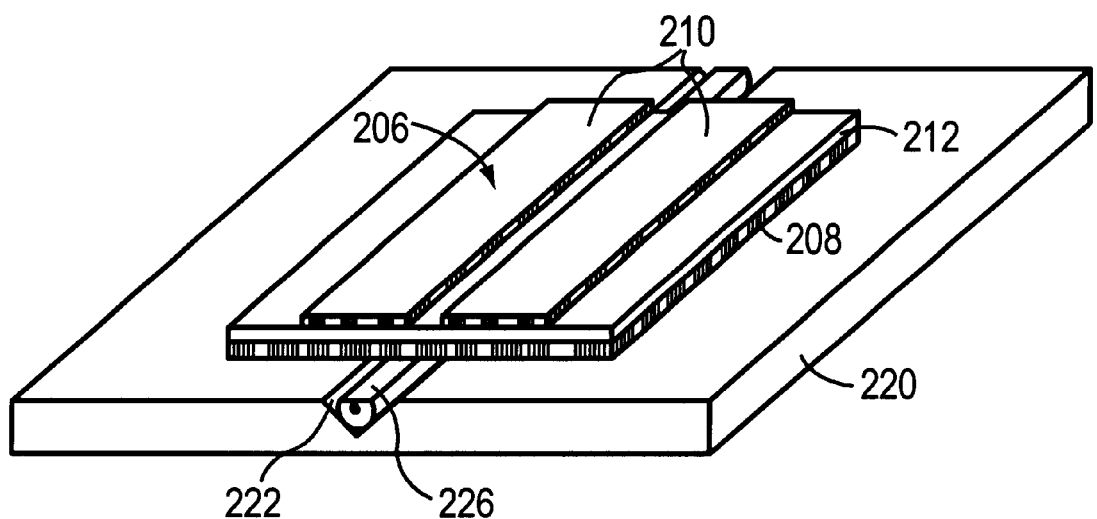
FIG. 8 is perspective view of a cylindrical integrated optics SPW modulator which can be utilized in the systems illustrated in FIGS. 1–6.

In FIG. 8, a preferred implementation of a cylindrical integrated optics (optical fiber) SPW modulator useful in the systems of FIGS. 1–6 is illustrated. The optical fiber SPW modulator is built on a base block 220 which can be quartz or fused silica. A V groove 222 is etched into the block and is used to support and direct an optical fiber 224. The V groove 224 also serves as a restraint so that a flat face 226 can be produced on the optical fiber by polishing away the cladding extending above the surface of the block 220. The groove depth is calculated such that after polishing away the fiber cladding extending over the surface of the block, the thickness of the residual cladding is that required for SPW and guided lightwave wavevector matching. The modulator structure 206 described previously is attached to the top of the block 220 such that the EO layer 212 is in contact with the metal layer 208. The application of a voltage to the modulator electrodes 210 introduces a refractive index variation in the EO layer 212, which in turn perturbs the wavevector of the SPW supported in the metal layer 208. The SPW wavevector variations translate to power coupling coefficient variations between the SPW and the guided lightwave propagating in the optical fiber 226 thereby causing transmitted light intensity variations inside of the fiber. For an embodiment of the optical fiber SPW modulator which includes a grating for wavevector matching, the grating can be formed inside the fiber core as an index grating.

Another suitable coplanar strip modulator structure which can be used with this embodiment and other embodiments of the cylindrical (optical fiber guiding layer) geometry is shown in *Continuous Fiber Modulator With High Bandwidth Coplanar Strip Electrodes* by Creany, et al. in *IEEE Photonics Technology Letters,* pp 355–357, Vol. 8, No. 3, March 1996. The disclosure of Creany, et al. is incorporated herein.

Figure 9:
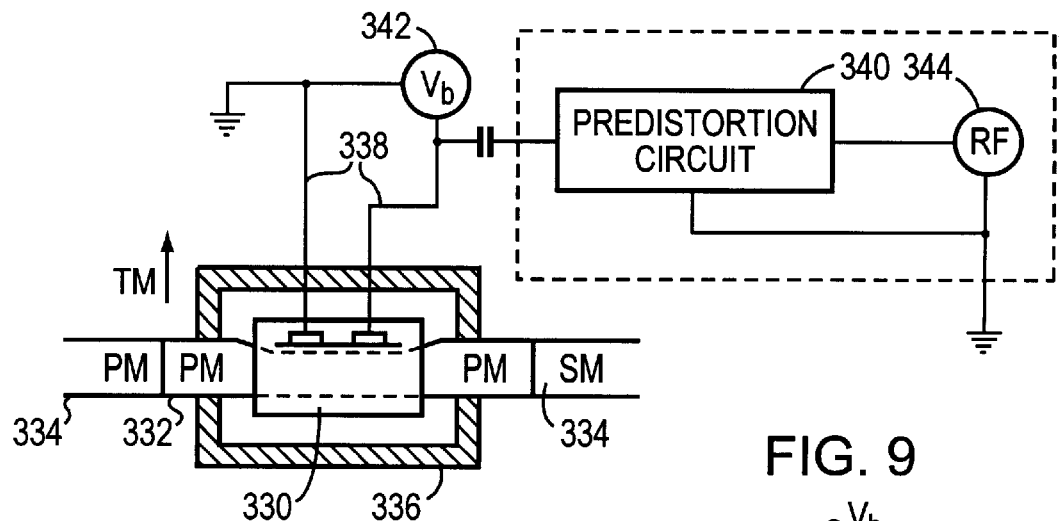
FIG. 9 is partially sectioned side view of the physical packaging, bias and modulator connections and the coupling to optical fiber of the communications systems for the SPW modulator illustrated in FIG. 8.

The integrated SPW modulators in the planar and the fiber embodiments can be easily connected in the systems illustrated in FIGS. 1–6 of the present invention. FIG. 9 illustrates the connection for the integrated fiber SPW modulator into a communications system. The fiber SPW modulator 330 is built on a polarization maintaining (PM) fiber 332. The PM fiber 332 is fusion spliced to the conventional PM fiber pigtail 334 which generally is used as a connector to a laser or other light source. The PM fiber 332 maintains the polarity of the light so that the TM mode is perpendicular to the plane of the metal layer supporting the SPW in the modulator 330. The use of the fusion splices instead of fiber couplers reduces reflection loss enough to in many instances eliminate the necessity of an optical isolator between the light source and the SPW modulator. In addition, the SPW modulator 330 can be encapsulated by any suitable integrated circuit method to provide a hermetically sealed cover 336 which provides the electrodes 338 to the system environment to connect to a bias voltage ($V_b$) 342 and a modulation signal voltage (RF) 344. Optionally, a predistortion circuit 340 can be inserted between the modulation signal voltage 344 and the SPW modulator 330 in the analog embodiments to provide compensation and distortion correction thereby further linearizing the modulation.

Figure 10:
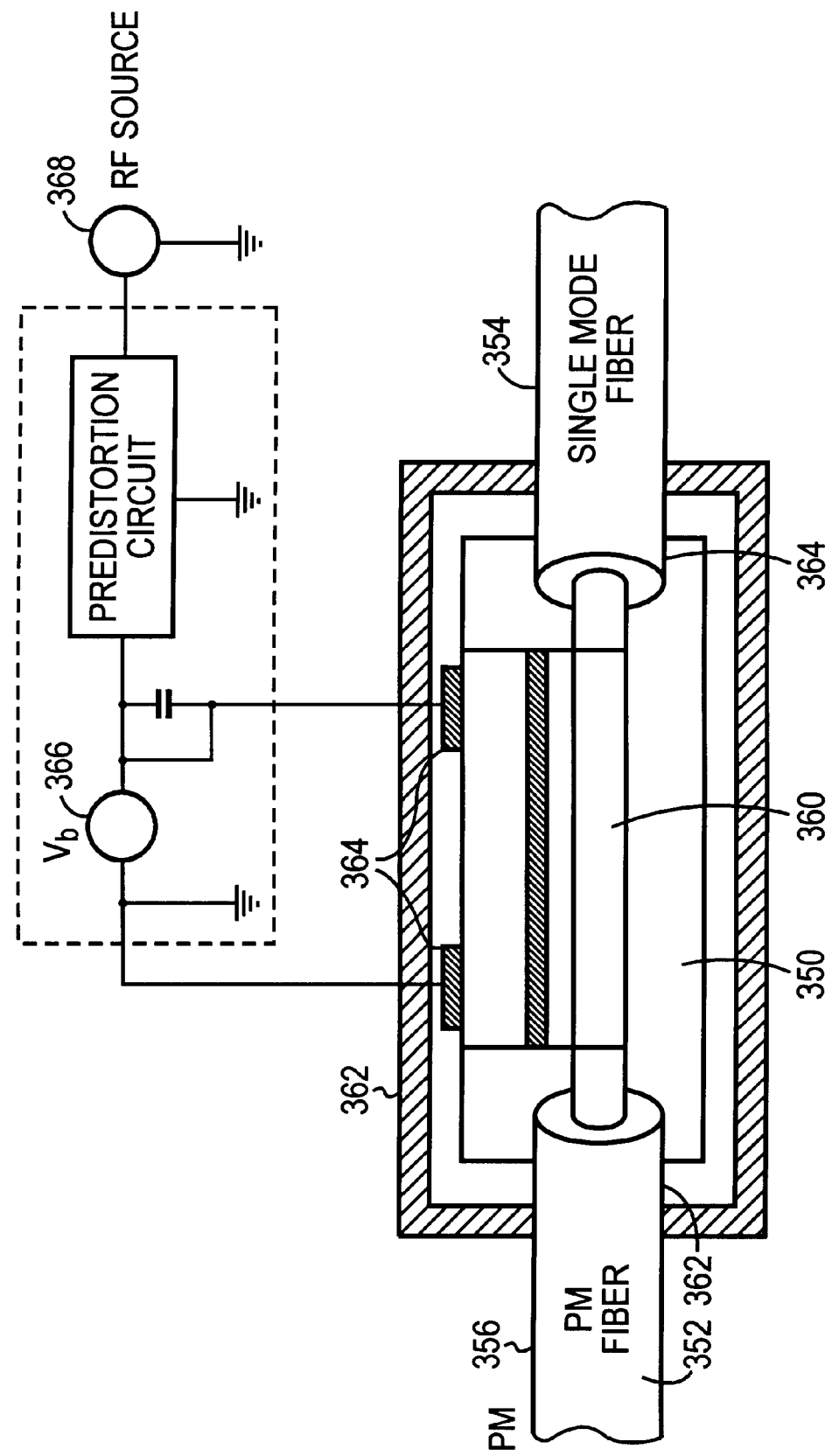
FIG. 10 is partially sectioned side view of the physical packaging, bias and modulator connections and the coupling to optical fiber of the communications systems for the SPW modulator illustrated in FIG. 7.

The connections of the planar integrated SPW modulator to the systems of FIGS. 1–6 are shown in FIG. 10. Similarly to the integrated fiber SPW modulator, the planar integrated SPW modulator 350 connects to the optical communications systems by means of two fiber links, one a PM fiber 352 and the other a SM fiber 354 which are fusion spliced to the fibers of the optical light source and to the optical link, respectively. The fiber links 352, 354 are optically coupled to the integrated waveguide 360 by fixing their ends into pockets or V grooves 362, 364 in the substrate material which align the fiber core with the waveguide. For the case of a planar waveguide of $SiO_2$, both the fiber and the planar waveguide are comprised of the same material. Therefore, they have equal expansion coefficients and they can be directly fusion spliced together. In addition, the SPW modulator can be encapsulated by any suitable integrated circuit method to provide a hermetically sealed cover 362 which provides the electrodes 364 to the system environment to connect to a bias voltage Vb 366 and a modulation signal voltage RF 368. Optionally, a predistortion circuit 370 can be inserted between the modulation signal voltage RF 368 and the SPW modulator 350 to provide compensation and distortion correction thereby further linearizing the modulation.

Figure 11:
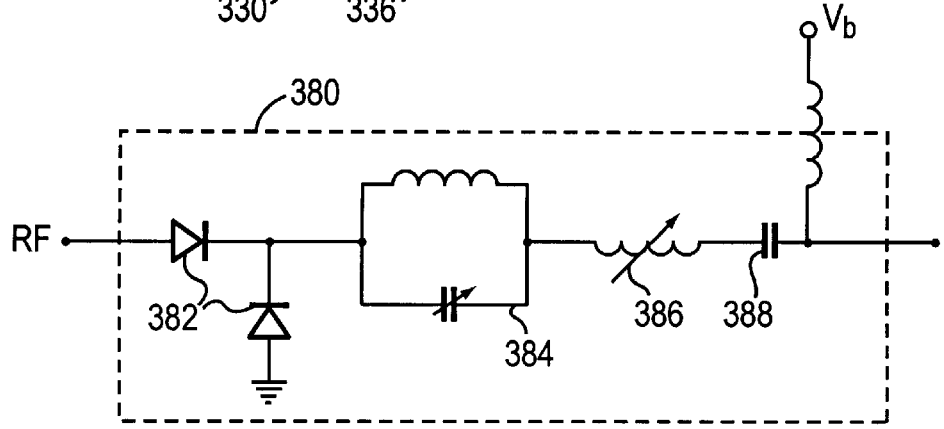
FIGS. 11 and 12 are electrical circuit diagrams for the preferred forms of the optional predistortion circuits for the SPW modulators illustrated in FIGS. 7–10 when designed for linear operation.

FIG. 11 shows one implementation of a predistortion circuit 380 which can be used with the SPW modulators. In general the circuit includes series and parallel nonlinear devices (diodes) 382 which generates a second order distortion term to cancel any in the transfer function characteristic of the modulator. In addition, a parallel circuit 384 of an inductor and a variable capacitor provide a method of varying the compensation as a function of frequency. Series connected variable resistor 386 provides for adjustment of the amplitude of the compensation signal and, in conjunction with the coupling capacitor 388, adjustment of the phase of the compensation signal.

Figure 12:
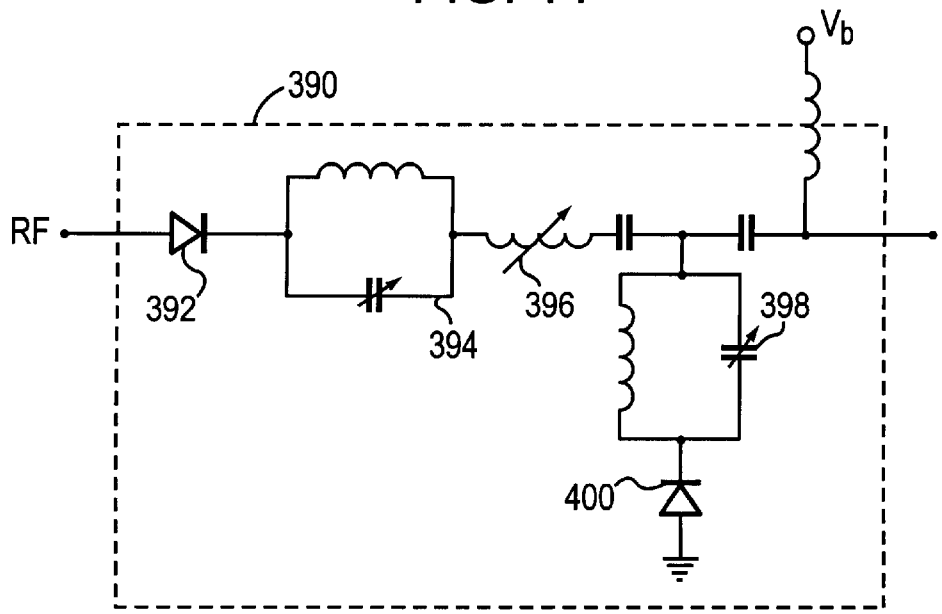

FIG. 12 illustrates another predistortion circuit which can be used for compensation and distortion correction of the SPW modulator. In this predistortion circuit, a series diode 392 is used to generate a second order distortion signal while parallel tuned circuit 394 provides for frequency compensation. A series tuned circuit 396 provides for the coupling to the SPW modulator and phase and amplitude adjustment. The parallel leg comprising a parallel tuned circuit 398 and a diode 400, establishes a third order distortion signal which can be added as needed to the second order distortion signal.

Figure 13:
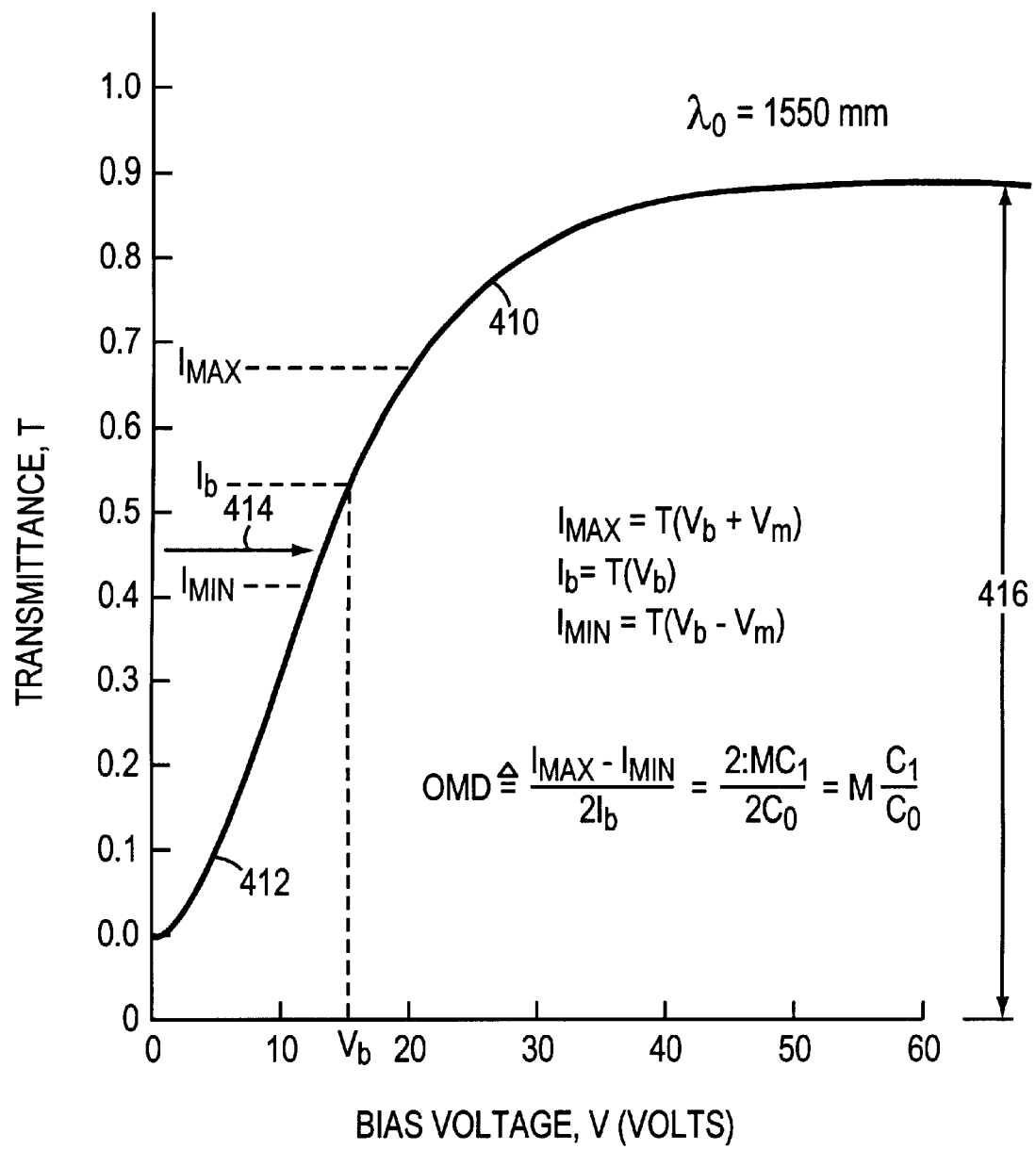
FIG. 13 is a graphical representation of output light intensity as a function of modulation voltage for the SPW modulators illustrated in FIGS. 1–6 for linear intensity modulation.

FIG. 13 is an exemplary representation of the transfer characteristic of the SPW modulator structures illustrated in FIGS. 7–10. The general transfer characteristic is a resonance curve 410 in which the intensity of the transmitted source light is shown as a function modulation voltage. The resonance curve has a minima point 412 at a particular wavelength. This is where the maximum attenuation of the guided light wavevector occurs because of maximum coupling of the guided lightwave into a SPW by the structure. For wavelengths of light not within the resonance curve, there is substantially no attenuation. The resonance curve can, to varying degrees, be designed having a characteristic for a specific wavelength resonance at minima 412, bandwidth 414 and attenuation percentage 416. The addition of the modulator structure to the basic SPW generation structure provides a means to shift the resonance curve to higher or lower wavelengths caused by the refractive index change in the EO layer of the modulation structure. An alternating or changing bias will produce modulation which is substantially linear over small variations in voltage. Therefore, a modulator small signal response can be obtained that is substantially linear and with an output intensity approximating a linear function of the applied bias voltage.

EXAMPLE

The transfer function illustrated in FIG. 13 is the theoretical response of a integrated fiber SPW modulator constructed in accordance with the SPW modulator embodiment shown in FIG. 8 and having a PM optical fiber as its base with a core index of refraction of 1.46. The cladding or buffer layer refractive index is 1.455 nm. The metal layer is Au with a refractive index of 0.52 real, −10.74j imaginary. The EO layer is a polymer with a refractive index of 1.78. The operating wavelength of the optical source is 1550 nm and the resonance of the transfer characteristic of the modulator is designed for that wavelength.

For the proposed SPW modulator represented by its transfer function in FIG. 13, the nonlinear characteristics of the device can found by first approximating the transfer function T(V) with a Taylor series expansion.

$$T(V)=a_0+a_1V^2+a_2V^2+a_3V^3+a_4V^4+a_5V^5$$

where ai are polynomial coefficients and V represents the total applied voltage, a DC bias plus an AC modulation voltage, $V=V_b+V_m$.

The Taylor series expansion of T(V) around the DC bias point, $V_b$ is:

$$T(V)=T(V_b)+dT/dV(V-V_b)+(\tfrac{1}{2})dT^2/dV^2(V-V_b)^2+(\tfrac{1}{6})dT^3/dV^3(V-V_b)^3$$

$$T(V)C_0+C_1V_m+C_2V_m^2+C_3V_m^3$$

where
$C_0=a_0+a_1V_b+a_2V_b^2+a_3V_b^3+a_4V_b^4+a_5V_b^5$
$C_1=a_1+2a_2V_b+3a_3V_b^2+4a_4V_b^3+5a_5V_b^4$
$C_2=a_2+3a_3V_b+6a_4V_b^2+10a_5V_b^3$
$C_3=a_3+4a_4V_b+10a_5V_b^2$ To determine the distortion products produced by the transfer characteristic T(V), a three tone modulation signal, $V_m=V-V_b=M[\sin(\omega_1 t)+\sin(\omega_2 t)+\sin(\omega_3 t)]$ is substituted into the equation.

This results in cross/harmonic modulation terms involving combinations of the frequencies where the larger ones are set out in the Table of FIG. 14. The frequencies ωi correspond to the carriers while the frequencies 2ωi, 3ωi correspond to second and third order harmonic distortion, respectively. Terms of the form $\omega_i \pm \omega_j$, where i≠j, and $\omega_i \pm \omega_j \pm \omega_k$ where i≠j≠k correspond to composite second order (CSO) and composite triple beat (CTB) distortion, respectively.

The optical modulation depth for the SPW modulator can also be expressed as a function of the coefficients of its Taylor series expansion:

$$OMD = M(C_1/C_0)$$

Similarly, a MZ modulator has an analytic transfer function;

$$T(V) = \tfrac{1}{2} \pm \tfrac{1}{2} \cos[\pi V/V_s],$$

where Vs is defined as the minimum switching voltage for a 100% modulation depth with a typical value $V_s = 2\pi$ Volts. This transfer function may be expanded about a DC bias point $V_b = V_s/2$ using the same method as for the SPW modulator. The expansion results only in odd terms:

$$T(V) = C_0 + C_1 V_m + C_3 V_m^3 + C_5 V_m^5,$$

where $C_0 = \tfrac{1}{2}$
$C_1 = \tfrac{1}{2}[\pi/V_s]$
$C_3 = \tfrac{1}{12}[\pi/V_s]^3$
$C_5 = \tfrac{1}{240}[\pi/V_s]^5$ The optical modulation depth for the MZ modulator can also be expressed as a function of the coefficients of its Taylor series expansion:

$$OMD = M(C_1/C_0)$$

Figure 15:
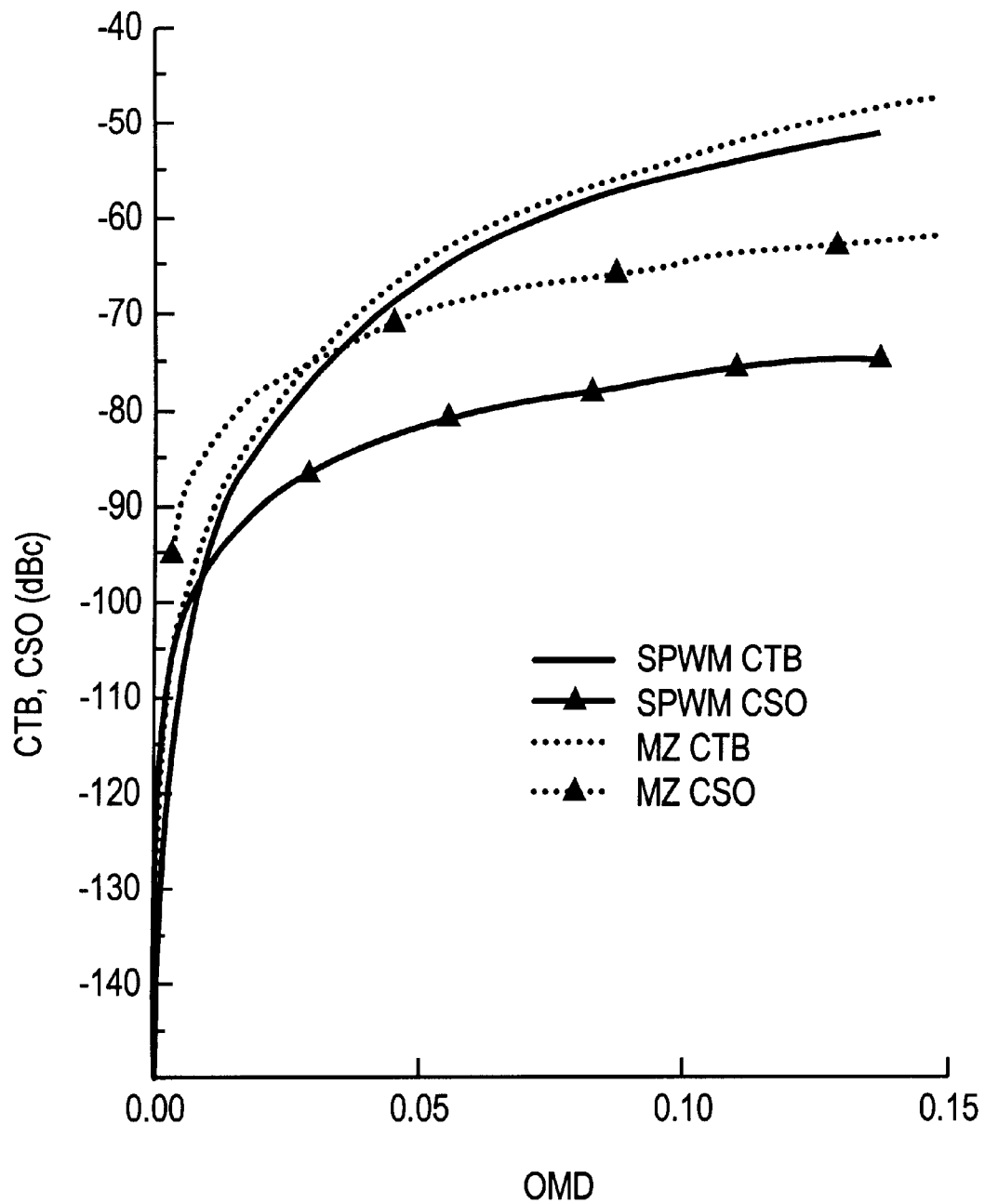
FIG. 15 is a graphical representation of the distortion products CTB, CSO for a SPW modulator compared to the distortion products CTB, CSO for a MZ modulator as a function of optical modulation depth.

A comparison can be made by simulating the SPW modulator by selecting numbers for the coefficients $a_0 \ldots a_5$ which generate its transfer function and simulating the MZ modulator by doing the same and then plotting the distortion products of both modulators as a function of OMD. The SPW modulator shows higher insensitivity to voltage perturbations around the dc bias point where CSO is zero than the MZ modulator. This is graphically illustrated in FIG. 15. Additionally, it is shown that the SPW modulator is at least similar to or better than the MZ modulator for both CSO and CTB. Other studies of the distortion of optical modulators including MZ modulators can be found in Halmane, et al., *Distortion Characteristics of Optical Directional Coupler Modulators, IEEE Transactions on Microwave Theory and Techniques,* Vol 38, May 1990.

The SPW modulators for the illustrated systems of FIGS. 1–6 can use known modulation techniques for either analog or digital channels. Specifically, a SPW modulator can have its intensity-voltage transfer characteristic tailored for the type of information the channel is designed to carry. For analog information, typically amplitude or phase modulated on a high frequency carrier, it is desirable to provide a linear transfer characteristic. Nonlinearities in the transfer function increase signal to noise ratio and distortions in the recovered signal. The more complex and the more extensive the bandwidth of the signal, the more important it is to provide a linear transfer characteristic. For nonlinear modulation, particularly direct digital modulation, it is less important to have a linear transfer characteristic because of the higher signal to noise ratios that can be tolerated. However, modulator bias voltage swings are important for high speed, power consumption and drive component size in digital applications.

In general, the transfer characteristic of the SPW modulators can be tailored during manufacturing to be specifically adapted to be more advantageous for either analog (linear) applications, or digital (nonlinear) applications. The transfer characteristic of the SPW modulator as shown in FIG. 13 is inherently highly linear. The SPW coupling is an example of a dissapative physical phenomenon which is substantially linear because of the relation of changes in the refractive index to changes in voltage. Therefore, for a linear SPW device, the physical thicknesses of the layers comprising the device are designed to match the propagation constant of the guided wavevector to the SPW in the metal layer as closely as possible.

Figure 16:
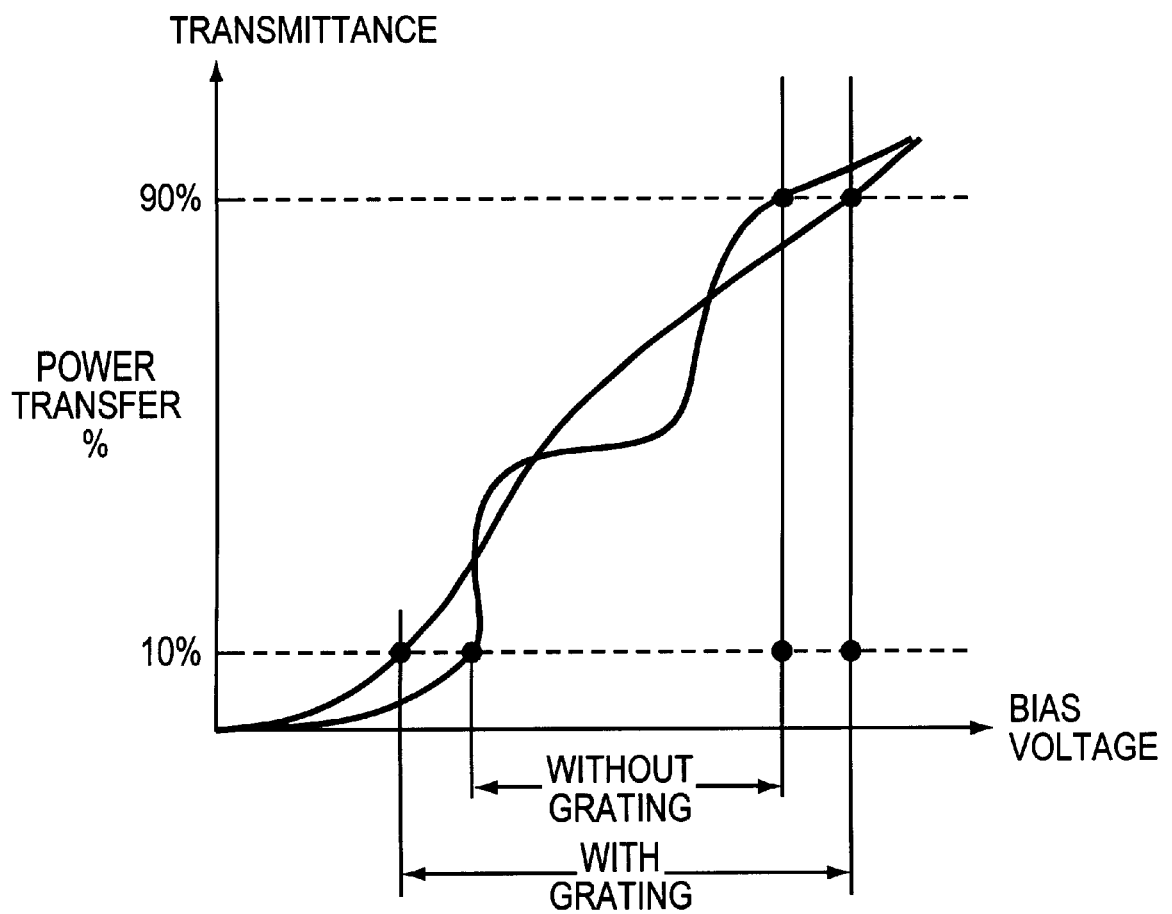
FIG. 16 is a graphical representation of output light intensity as a function of modulation voltage for the SPW modulators illustrated in FIGS. 1–6 when their transfer functions are tailored for digital intensity modulation.

Alternatively, matching gratings, such as surface relief and index gratings, can be designed to introduce nonlinearities into the power coupling and transfer characteristics of the device for digital modulation. A grating assisted coupling mechanism is not linear in nature and the coupling of power between one waveguide (guided layer) to the second waveguide (metal layer) may have a step like shape. This power transfer function shape is a function of the physical parameters of the grating as well as the wave vector mismatch of the SPW and the guided mode. The nonlinear character of the power transfer function is highly desirable because it introduces sharp slopes in the power coupling efficiency as seen in FIG. 16. By taking advantage of the distorted power transfer characteristic, the modulation voltage which is required to reach a given modulation depth can be reduced. Therefore, SPW modulators that are implemented using a grating coupler will need less voltage to swing from 10% to 90% than SPW modulators without a grating. In general, the greater the propagation mismatch between the waveguides, the greater will be the nonlinear effect. Further the step like response is affected by the grating parameters such as changes in refractive index, period, group height, filling factor, etc.

Because gratings are sensitive to wavelength variations additional advantages can be provided by using them in the SPW modulators. A grating assisted coupler may have 100% power transfer at a given wavelength and a 0% power transfer at a relatively close wavelength. Fiber Bragg gratings can have a subnanometer FWHM bandwidth. Therefore, a SPW modulator implemented utilizing a fiber grating to match the SPW and the guided mode wavevectors to assist in power coupling can operate within an extremely narrow bandwidth of 1–2 nm outside of which it will act as almost a transparent element. The same principles apply for both fiber and planar SPW modulators.

Since gratings assist power coupling, they also reduce the necessary interaction length of the guided layer and the metal layer for complete power transfer between the guided mode wave and the SPW. The length reduction is a desirable feature, since it improves the device temperature insensitivity and allows high density integration.

The function of a grating in the SPW modulator structure is to match the wavevectors of the SPW supported by the metal layer, $K_{SPW}$, and the guided lightwave, $K_g$, which propagates in the guiding layer for the case of planar integrated optical structures or in the fiber core for the case of a cylindrical geometry integrated optical structures. The wavevector magnitude matching condition is:

$$K_{SPW} = K_g \pm NK_G$$

where the grating wavevector $K_G = 2\pi/\Lambda$. The most efficient power coupling effects take place for the Bragg regime, i.e., where N=1, and generally the larger the N the less the power coupling efficiency between the two waves.

Figure 17A:
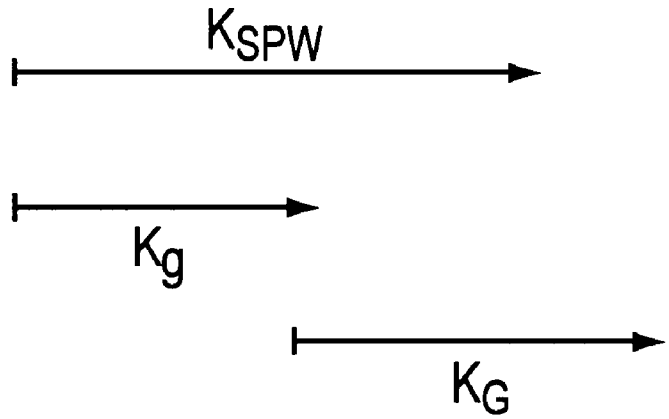
FIGS. 17A and 17B are vectors waveform diagrams of the results of the utilization of transmissive and reflective gratings used in matching the guided mode wavevector to the SPW.
Figure 17B:
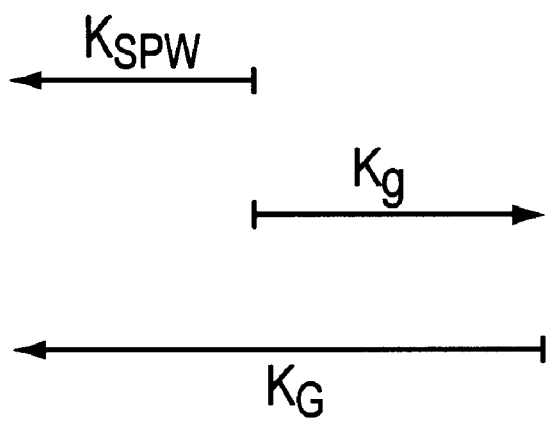

The above equation is general and holds for both co-directional and contra-directional power coupling between the SPW and the guided wave. Co-directional power coupling is when the guided wave and the SPW propagate in the same direction while contra-directional power coupling is when the SPW propagates in the opposite direction of the guided wave. The achievable grating period Λ and the difference between the two wavevectors $|K_g - K_{SPW}|$ will dictate the power flow direction. The power will be coupled in the direction of the most efficient matching condition, N=1. For example, for a large Λ, i.e., small $K_G$, and $K_g \approx K_{SPW}$, the matching condition is satisfied for N=1 for efficient co-directional power coupling, and for N>1 for the inefficient contra-directional power coupling as seen in FIG. 17A. Therefore, the power is coupled co-directionally. However, when Λ is small, i.e., $K_G$ is large, the contra-directional power coupling will be much more efficient than the co-directional one as seen in FIG. 17B. Therefore, the power will be coupled contra-directionally. These power coupling mechanisms of opposite direction are identical to the operational principles of transmission and reflection gratings on planar optical waveguides and optical fibers.

The SPW modulator designer can select either of the power coupling mechanisms by designing the grating to be transmissive or reflective. It should be noted the contra-directional power coupling may generate backward propagating optical waves due to inverse power coupling from the metal layer to the guiding layer. This backward propagating optical power may reach the laser source, which could necessitate the use of an optical isolator. But when there is an isolator installed between the SPW modulator and the optical source either co-directional and contra-directional power mechanisms can be implemented. Fabrication limitations on the attainable grating period as well as the difference of the two wavevectors $|K_g - K_{SPW}|$ will dictate which direction of power coupling satisfies the matching equation with N=1. Even though the contra-directional power coupling may generate backwards propagating power towards the light source, it is a highly wavelength sensitive process that can be used for the deisgn of the cascaded SPW modulator configurations where wavelength sensitivity is very important.

While the invention has been described in connection with the preferred embodiments, this specification is not intended to limit the scope of the invention to the particular forms set forth, but, on the contrary, it is intended to cover any such alternatives, modifications, and equivalents as may be included within the spirit and scope of the invention as defined by the appended claims.

What is claimed is:

1. An optical communications system for the transmission and reception of an optically modulated information signal over a communications link, said system comprising:

an optical transmitter including
   a laser source producing an optical source signal at wavelength $\lambda_0$, and
   an external modulator of the SPW type coupled to receive the optical source signal, the SPW modulator having a transfer function with a resonance at $\lambda_0$ for intensity modulating the optical source signal with an information signal, said SPW modulator comprising
      a multilayer waveguide including
         a thin SPW generation layer having a thickness designed to support at least one surface plasmon wave mode, and
         a first dielectric layer located on one side of said SPW generation layer forming a guiding layer of the waveguide and supporting at least one guided mode of said optical source signal into and out of said waveguide; and
      a modulation structure including,
         a second dielectric layer located on the other side of the SPW generation layer and formed of electro-optic material whose refractive index may be varied, and
         means disposed on a side of the dielectric layer opposite the SPW layer, for electrically varying the refractive index of said electro-optic material to perturb the propagation constant of said at least one plasmon wave mode in said thin SPW generation layer and thereby the coupling coefficient of the guided optical source signal into the surface plasmon wave;
an optical fiber link coupled to said optical transmitter for receiving the optical information signal at a sending end and carrying the optical information signal to a receiving end; and
an optical receiver coupled to the receiving end of said optical fiber link for receiving the optical information signal and demodulating the optical information signal into said information signal.

2. An optical communications system as set forth in claim 1 wherein:
   said information signal is an analog information signal and said modulation is substantially linear.

3. An optical communications system as set forth in claim 2 wherein:
   said information signal is a broadband information signal of the CATV type.

4. An optical communications system as set forth in claim 3 which further includes:
   means for predistorting said broadband information signal prior to said modulation.

5. An optical communications system as set forth in claim 1, wherein:
   said guiding layer has a planar geometry.

6. An optical communications system as set forth in claim 1, wherein:
   said guiding layer has a cylindrical geometry.

7. An optical communications system as set forth in claim 6, wherein:
   said guiding layer is the core of an optical fiber.

8. An optical communications system as set forth in claim 1 wherein:
   said information signal is a digital signal.

9. An optical communications system as set forth in claim 8 wherein:
   said SPW modulator includes an integrated optical grating for assisting in matching the coupling between the optical guided mode and the SPW.

10. An optical communications system as set forth in claim 1 wherein:
    said SPW generation layer includes an optical grating for assisting in matching the coupling between the optical source and the SPW and said grating is a reflective grating.

11. An optical communications system for the transmission and reception of an optically modulated information signal over one or more communications links, said system comprising:
    an optical transmitter including a laser source producing an optical source signal and coupled to an optical splitter having a plurality of optical source outputs;
    a plurality of external modulators of the SPW type, each for modulating a respective optical source output signal with an information signal, said SPW modulators each comprising a multilayer waveguide including,
   a thin SPW generation layer having a thickness designed to support at least one surface plasmon wave mode, and
   a first dielectric layer located on one side of said SPW generation layer forming a guiding layer of the wave guide and supporting at least one guided mode of said optical source signal into and out of said waveguide; and
a modulation structure including,
   a second dielectric layer located on the other side of the SPW generation layer and formed of electro-optic material whose refractive index may be varied, and
   means for varying the refractive index of said electro-optic material to perturb the propagation constant of said at least one plasmon wave mode in said thin SPW generation layer and thereby the coupling coefficient of the guided optical source signal into the surface plasmon wave;
a plurality of optical fibers coupled to said external modulators, each for receiving a respective optical information signal at a sending end and carrying the optical information signal to a receiving end; and
a plurality of optical receivers, each coupled to the receiving end of an associated optical fiber for receiving the optical information signal and demodulating the optical information signal into an information signal.

12. An optical communications system as set forth in claim 11 wherein:
said information signal is an analog information signal and said modulation is substantially linear.

13. An optical communications system as set forth in claim 11 wherein:
said information signal is a broadband information signal of the CATV type.

14. An optical communications system as set forth in claim 13 which further includes:
means for predistorting said broadband information signal prior to said modulation.

15. An optical communications system as set forth in claim 11, wherein:
said guiding layer has a planar geometry.

16. An optical communications system as set forth in claim 11, wherein:
said guiding layer has a cylindrical geometry.

17. An optical communications system as set forth in claim 16, wherein:
said guiding layer is the core of an optical fiber.

18. An optical communications system as set forth in claim 11 wherein:
said information signal is a digital signal.

19. An optical communications system as set forth in claim 18 wherein:
said SPW modulator includes an integrated optical grating for assisting in matching the coupling between the optical guided mode and the SPW.

20. An optical communications system as set forth in claim 11 wherein:
said SPW generation layer includes an optical grating for assisting in matching the coupling between the optical source and the SPW and said grating is a reflective grating.

21. An optical WDM communications system for the transmission and reception of an optically modulated WDM information signal over a communications link, said system comprising:

an optical transmitter including a wide band light source producing an optical source signal comprising a plurality of different wavelengths and coupled to an optical demultiplexer having a plurality of optical source outputs for separating the source outputs into separate wavelengths;
a plurality of external modulators of the SPW type, each for modulating a respective optical source output signal with a respective information signal, each of the SPW modulators comprising
   a multilayer waveguide including,
      a thin SPW generation layer having a thickness designed to support at least one surface plasmon wave mode, and
      a first dielectric layer located on one side of said SPW generation layer forming a guiding layer of the waveguide and supporting at least one guided mode of said optical source signal into and out of said waveguide; and
   a modulation structure including
      a second dielectric layer located on the other side of the SPW generation layer and formed of electro-optic material whose refractive index may be varied, and
      means for electrically varying the refractive index of said electro-optic material to perturb the propagation constant of said at least one plasmon wave mode in said thin SPW generation layer and thereby the coupling coefficient of the guided optical source signal into the surface plasmon wave, and
an optical multiplexer coupled to the outputs of said plurality of SPW modulators for combining the modulated source signal into a WDM optical information signal;
at least one optical fiber coupled to said optical multiplexer for receiving said WDM optical information signal at a sending end and carrying the WDM optical information signal to a receiving end;
an optical demultiplexer coupled to the receiving end of said one optical fiber for demultiplexing said WDM optical signal into a plurality of optical information signals at said different wavelengths; and
a plurality of optical receivers, each coupled to an associated output, said optical demultiplexer for receiving a respective optical information signal and demodulating the optical information signal into an information signal.

22. An optical communications system as set forth in claim 21 wherein:
said information signal is an analog information signal and said modulation is substantially linear.

23. An optical communications system as set forth in claim 22 wherein:
said information signal is a broadband information signal of the CATV type.

24. An optical communications system as set forth in claim 23 which further includes:
means for predistorting said broadband information signal prior to said modulation.

25. An optical communications system as set forth in claim 21, wherein:
said guiding layer has a planar geometry.

26. An optical communications system as set forth in claim 21, wherein:
said guiding layer has a cylindrical geometry.

27. An optical communications system as set forth in claim 26, wherein:
said guiding layer is the core of an optical fiber.

28. An optical communications system as set forth in claim 21 wherein:
said information signal is a digital signal.

29. An optical communications system as set forth in claim 28 wherein:
said SPW modulator includes an integrated optical grating for assisting in matching the coupling between the optical guided mode and the SPW.

30. An optical communications system as set forth in claim 21 wherein:
said SPW generation layer includes an optical grating for assisting in matching the coupling between the optical source and the SPW and said grating is a reflective grating.

31. An optical communications system for the transmission and reception of an optically modulated WDM information signal over a communications link, said system comprising:
a laser transmitter including a plurality of laser sources producing corresponding optical source signals comprising a plurality of different wavelengths;
a plurality of external modulators of the SPW type, each for modulating a respective optical source output signal with an information signal, each said SPW modulator comprising
a multilayer waveguide including
a thin SPW generation layer having a thickness to support at least one surface plasmon wave mode, and
a first dielectric layer located on one side of said SPW generation layer forming a guiding layer of the waveguide and supporting at least one guided mode of said optical source signal into and out of said waveguide; and
a modulation structure including
a second dielectric layer located on the other side of the SPW generation layer and formed of electro-optic material whose refractive index may be varied, and
means for electrically varying the refractive index of said electro-optic material to perturb the propagation constant of said at least one plasmon wave mode in said thin SPW generation layer and thereby the coupling coefficient of the guided optical source signal into the surface plasmon wave, and
an optical multiplexer coupled to the outputs of said plurality of SPW modulators for combining the modulated source signal into a WDM optical information signal;
at least one optical fiber coupled to said optical multiplexer for receiving said WDM optical information signal at a sending end and carrying the WDM optical information signal to a receiving end;
an optical demultiplexer coupled to the receiving end of said one optical fiber for demultiplexing said WDM optical signal into a plurality of optical information signals at said different wavelengths; and
a plurality of optical receivers, each coupled to an associated output of said optical demultiplexer for receiving a respective optical information signal and demodulating the optical information signal into an information signal.

32. An optical communications system as set forth in claim 31 wherein:
said information signal is an analog information signal and said modulation is substantially linear.

33. An optical communications system as set forth in claim 32 wherein:
said information signal is a broadband information signal of the CATV type.

34. An optical communications system as set forth in claim 33 which further includes:
means for predistorting said broadband information signal prior to said modulation.

35. An optical communications system as set forth in claim 31, wherein:
said guiding layer has a planar geometry.

36. An optical communications system as set forth in claim 31, wherein:
said guiding layer has a cylindrical geometry.

37. An optical communications system as set forth in claim 36, wherein:
said guiding layer is the core of an optical fiber.

38. An optical communications system as set forth in claim 31 wherein:
said information signal is a digital signal.

39. An optical communications system as set forth in claim 38 wherein:
said SPW modulator includes an integrated optical grating for assisting in matching the coupling between the optical guided mode and the SPW.

40. An optical communications system as set forth in claim 31 wherein:
said SPW generation layer includes an optical grating for assisting in matching the coupling between the optical source and the SPW and said grating is a reflective grating.

41. An optical WDM communications system for the transmission and reception of an optically modulated WDM information signal over a communications link, said system comprising:
an optical transmitter including a wide band light source producing an optical source signal comprising a plurality of different wavelengths;
a plurality of external modulators of the SPW type, each for modulating a respective optical source output signal with an information signal, said SPW modulators each comprising:
a multilayer waveguide including,
a thin SPW generation layer having a thickness to support at least one surface plasmon wave mode, and
a first dielectric layer located on one side of said SPW generation layer forming a guiding layer of the waveguide and supporting at least one guided mode of said optical source signal into and out of said waveguide; and
a modulation structure including,
a second dielectric layer located on the other side of the SPW generation layer and formed of electro-optic material whose refractive index may be varied, and
means for electrically varying the refractive index of said electro-optic material to perturb the propagation constant of said at least one plasmon wave mode in said thin SPW generation layer and thereby the coupling coefficient of the guided optical source signal into the surface plasmon wave, and at least one optical fiber coupled to the output of the last external modulator for receiving said WDM optical information signal at a sending end and carrying the WDM optical information signal to a receiving end;

an optical demultiplexer coupled to the receiving end of said one optical fiber for demultiplexing said WDM optical signal into a plurality of optical information signals at said different wavelengths; and a plurality of optical receivers, each coupled to an associated output of said optical demultiplexer for receiving a respective optical information signal and demodulating the optical information signal into an information signal.

42. An optical communications system as set forth in claim 41 wherein:

said information signal is an analog information signal and said modulation is substantially linear.

43. An optical communications system as set forth in claim 42 wherein:

said information signal is a broadband information signal of the CATV type.

44. An optical communications system as set forth in claim 43 which further includes:

means for predistorting said broadband information signal prior to said modulation.

45. An optical communications system as set forth in claim 41, wherein:

said guiding layer has a planar geometry.

46. An optical communications system as set forth in claim 41, wherein:

said guiding layer has a cylindrical geometry.

47. An optical communications system as set forth in claim 46, wherein:

said guiding layer is the core of an optical fiber.

48. An optical communications system as set forth in claim 41 wherein:

said information signal is a digital signal.

49. An optical communications system as set forth in claim 48 wherein:

said SPW modulator includes an integrated optical grating for assisting in matching the coupling between the optical guided mode and the SPW.

50. An optical communications system as set forth in claim 41 wherein:

said SPW generation layer includes an optical grating for assisting in matching the coupling between the optical source and the SPW and said grating is a reflective grating.

51. An optical WDM communications system for the transmission and reception of an optically modulated WDM information signal over a communications link, said system comprising:

a laser transmitter including a plurality of laser sources producing corresponding optical source signals comprising a plurality of different wavelengths;

an optical multiplexer coupled to the outputs of said plurality of laser sources for combining the unmodulated source signals into a WDM optical source signal; and a plurality of external modulators of the SPW type, each for modulating a respective optical source output signal with a respective information signal coupled in series with the output of said optical multiplexer, each said SPW modulator comprising a multilayer waveguide including,
a thin SPW generation layer having a thickness designed to support at least one surface plasmon wave mode, and a first dielectric layer located on one side of said SPW generation layer forming a guiding layer of the waveguide and supporting at least one guided mode of said optical source signal into and out of said waveguide; and a modulation structure including,
a second dielectric layer located on the other side of the SPW generation layer and formed of electro-optic material whose refractive index may be varied, and means for electrically varying the refractive index of said electro-optic material to perturb the propagation constant of said at least one plasmon wave mode in said thin SPW generation layer and thereby the coupling coefficient of the guided optical source signal into the surface plasmon wave, at least one optical fiber coupled to the last of said external modulators for receiving said WDM optical information signal at a sending end and carrying the WDM optical information signal to a receiving end;

an optical demultiplexer coupled to the receiving end of said one optical fiber for demultiplexing said WDM optical signal into a plurality of optical information signals at said different wavelengths; and a plurality of optical receivers, each coupled to an associated output of said optical demultiplexer for receiving a respective optical information signal and demodulating the optical information signal into an information signal.

52. An optical communications system as set forth in claim 51 wherein:

said information signal is an analog information signal and said modulation is substantially linear.

53. An optical communications system as set forth in claim 52 wherein:

said information signal is a broadband information signal of the CATV type.

54. An optical communications system as set forth in claim 53 which further includes:

means for predistorting said broadband information signal prior to said modulation.

55. An optical communications system as set forth in claim 51, wherein:

said guiding layer has a planar geometry.

56. An optical communications system as set forth in claim 51, wherein:

said guiding layer is the core of an optical fiber.

57. An optical communications system as set forth in claim 56, wherein:

said guiding layer is the core of an optical fiber.

58. An optical communications system as set forth in claim 51 wherein:

said information signal is a digital signal.

59. An optical communications system as set forth in claim 58 wherein:

said SPW modulator includes an integrated optical grating for assisting in matching the coupling between the optical guided mode and the SPW.

60. An optical communications system as set forth in claim 51 wherein:

said SPW generation layer includes an optical grating for assisting in matching the coupling between the optical source and the SPW and said grating is a reflective grating.

61. An optical transmitter adapted to transmit an optically modulated information signal over an optical fiber communications link, said transmitter comprising:

a laser source producing an optical source signal at wavelength $\lambda_0$; and an external modulator of the SPW type having a transfer function with a resonance at $\lambda_0$ for intensity modulating the optical source signal with an information signal and adapted for coupling to an optical fiber communications link, said SPW modulator including a multilayer waveguide including,
 a thin SPW generation layer having a thickness designed to support at least one surface plasmon wave mode, and
 a first dielectric layer located on one side of said SPW generation layer forming a guiding layer of the waveguide and supporting at least one guided mode of said optical source signal into and out of said waveguide; and
a modulation structure including,
 a second dielectric layer located on the other side of the SPW generation layer and formed of electro-optic material whose refractive index may be varied, and
 means for electrically varying the refractive index of said electro-optic material to perturb the propagation constant of said at least one plasmon wave mode in said thin SPW generation layer and thereby the coupling coefficient of the guided optical source signal into the surface plasmon wave.

62. An optical transmitter adapted to transmit an optically modulated information signal over an optical fiber communications links, said transmitter comprising:

a laser source producing an optical source signal at wavelength $\lambda_0$ and coupled to an optical splitter having a plurality of optical source outputs; and a plurality of external modulators of the SPW type having a transfer function with a resonance at $\lambda_0$, each for intensity modulating a respective optical source output signal with an information signal and adapted for coupling to an optical fiber communications link, each said SPW modulator including a multilayer waveguide including,
 a thin SPW generation layer having a thickness designed to support at least one surface plasmon wave mode, and
 a first dielectric layer located on one side of said SPW generation layer forming a guiding layer of the waveguide and supporting at least one guided mode of said optical source signal into and out of said waveguide, and
a modulation structure including,
 a second dielectric layer located on the other side of the SPW generation layer and formed of electro-optic material whose refractive index may be varied, and
 means for electrically varying the refractive index of said electro-optic material to perturb the propagation constant of said at least one plasmon wave mode in said thin SPW generation layer and thereby the coupling coefficient of the guided optical source signal into the surface plasmon wave.

63. An optical transmitter adapted to transmit a plurality of optically modulated information signals combined into a WDM information signal over an optical fiber communications link, said transmitter comprising:

a wide band light source producing an optical source signal comprising a plurality of different wavelengths and coupled to an optical demultiplexer having a plurality of optical source outputs for separating the source output into the separate wavelengths;

a plurality of external modulators of the SPW type, each for modulating a respective optical source output signal with an information signal, said SPW modulators each comprising:

a multilayer waveguide including,
 a thin SPW generation layer having a thickness designed to support at least one surface plasmon wave mode, and
 a first dielectric layer located on one side of said SPW generation layer forming a guiding layer of the waveguide and supporting at least one guided mode of said optical source signal into and out of said waveguide; and
a modulation structure including,
 a second dielectric layer located on the other side of the SPW generation layer and formed of electro-optic material whose refractive index may be varied, and
 means for electrically varying the refractive index of said electro-optic material to perturb the propagation constant of said at least one plasmon wave mode in said thin SPW generation layer and thereby the coupling coefficient of the guided optical source signal into the surface plasmon wave; and
an optical multiplexer coupled to the outputs of said plurality of SPW modulators for combining the modulated source signals into a WDM optical information signal.

64. An optical transmitter adapted to transmit a plurality of optically modulated information signals combined into a WDM information signal over an optical fiber communications link, said transmitter comprising:

a plurality of external modulators of the SPW type, each for modulating a respective optical source output signal with an information signal, said SPW modulators each comprising:

a multilayer waveguide including,
 a thin SPW generation layer having a thickness designed to support at least one surface plasmon wave mode, and
 a first dielectric layer located on one side of said SPW generation layer forming a guiding layer of the waveguide and supporting at least one guided mode of said optical source signal into and out of said waveguide; and
a modulation structure including,
 a second dielectric layer located on the other side of the SPW generation layer and formed of electro-optic material whose refractive index may be varied, and
 means for electrically varying the refractive index of said electro-optic material to perturb the propagation constant of said at least one plasmon wave mode in said thin SPW generation layer and thereby the coupling coefficient of the guided optical source signal into the surface plasmon wave; and
an optical multiplexer coupled to the outputs of said plurality of SPW modulators for combining the modulated source signals into a WDM optical information signal.

65. An optical transmitter adapted to transmit a plurality of optically modulated information signals combined into a WDM information signal over an optical fiber communications link, said transmitter comprising:

a wide band light source producing an optical source signal comprising a plurality of different wavelengths; and a plurality of external modulators of the SPW type, each for modulating a different wavelength of said optical source output signal with an information signal, said external modulators coupled in series with the output of said wide band light source to generate a WDM information signal, said SPW modulators each comprising:

a multilayer waveguide including,
- a thin SPW generation layer having a thickness designed to support at least one surface plasmon wave mode, and
- a first dielectric layer located on one side of said SPW generation layer forming a guiding layer of the waveguide and supporting at least one guided mode of said optical source signal into and out of said waveguide; and a modulation structure including,
- a second dielectric layer located on the other side of the SPW generation layer and formed of electro-optic material whose refractive index may be varied,
- means for electrically varying the refractive index of said electro-optic material to perturb the propagation constant of said at least one plasmon wave mode in said thin SPW generation layer and thereby the coupling coefficient of the guided optical source signal into the surface plasmon wave.

66. An optical transmitter adapted to transmit a plurality of optically modulated information signals combined into a WDM information signal over an optical fiber communications link, said transmitter comprising:

a plurality of laser sources producing corresponding optical source signals comprising a plurality of different wavelengths;

an optical multiplexer coupled to the outputs of said plurality of laser sources for combining the unmodulated source signals into a WDM optical source signal; and a plurality of external modulators of the SPW type, each for modulating a respective optical source output signal with an information signal coupled in series with the output of said optical multiplexer, said SPW modulators each comprising:

a multilayer waveguide including,
- a thin SPW generation layer having a thickness designed to support at least one surface plasmon wave mode, and
a first dielectric layer located on one side of said SPW generation layer forming a guiding layer of the waveguide and supporting at least one guided mode of said optical source signal into and out of said waveguide; and
a modulation structure including,
- a second dielectric layer located on the other side of the SPW generation layer and formed of electro-optic material whose refractive index may be varied,
- means for electrically varying the refractive index of said electro-optic material to perturb the propagation constant of said at least one plasmon wave mode in said thin SPW generation layer and thereby the coupling coefficient of the guided optical source signal into the surface plasmon wave.

67. An optical communications system for the transmission and reception of an optically modulated information signal over a communications link, said system comprising:

an optical transmitter including a laser source producing an optical source signal at wavelength $\lambda_0$;

a first optical fiber link for coupling said optical source signal to an external modulator remote of the laser source;

said external modulator being of the SPW type having a transfer function with a resonance at $\lambda_0$ for intensity modulating the optical source signal with an information signal to generate an optical information signal said external modulator comprising:

a multilayer waveguide including,
- a thin SPW generation layer having a thickness designed to support at least one surface plasmon wave mode, and
- a first dielectric layer located on one side of said SPW generation layer forming a guiding layer of the waveguide and supporting at least one guided mode of said optical source signal into and out of said waveguide; and a modulation structure including,
- a second dielectric layer located on the other side of the SPW generation layer and formed of electro-optic material whose refractive index may be varied, and
- means for electrically varying the refractive index of said electro-optic material to perturb the propagation constant of said at least one plasmon wave mode in said thin SPW generation layer and thereby the coupling coefficient of the guided optical source signal into the surface plasmon wave;

a second optical fiber link coupled to said external modulator for coupling the optical information signal to an optical receiver; and said optical receiver for receiving the optical information signal and demodulating the optical information signal into said information signal.

* * * * *